United States Patent [19]
Goulet et al.

[11] Patent Number: 6,102,246
[45] Date of Patent: Aug. 15, 2000

[54] AUTOMATED BEVERAGE SYSTEM

[75] Inventors: Douglas P. Goulet, Big Lake, Minn.; Lawrence B. Ziesel, Woodstock; Kenneth S. Weinaug, Lilburn, both of Ga.; Jimmie L. Coffey, St. Charles, Ill.

[73] Assignee: Restaurant Technology, Inc., Oak Brook, Ill.

[21] Appl. No.: 09/441,071

[22] Filed: Nov. 16, 1999

Related U.S. Application Data

[62] Division of application No. 08/996,237, Dec. 22, 1997.

[51] Int. Cl.$^7$ ................................................ G07F 11/12
[52] U.S. Cl. ......................................... 221/11; 221/121
[58] Field of Search ........................... 221/5, 8, 11, 13, 221/21, 119, 121, 120, 122, 132, 221, 222

[56] References Cited

U.S. PATENT DOCUMENTS

| | | |
|---|---|---|
| 1,058,787 | 4/1913 | Nias . |
| 1,131,255 | 3/1915 | Luellen . |
| 1,609,581 | 12/1926 | Smith . |
| 1,623,353 | 4/1927 | McCarthy . |
| 1,657,879 | 1/1928 | Carle . |
| 1,975,649 | 10/1934 | Reifsnyder . |
| 3,315,842 | 4/1967 | McGurk . |
| 3,364,959 | 1/1968 | Herman et al. . |
| 3,435,988 | 4/1969 | Jonas et al. . |
| 3,618,642 | 11/1971 | Beulieu . |
| 4,327,843 | 5/1982 | Corley . |
| 4,590,975 | 5/1986 | Credle, Jr. . |
| 4,944,337 | 7/1990 | Credle, Jr. et al. . |
| 4,951,719 | 8/1990 | Wiley et al. . |
| 4,961,447 | 10/1990 | Credle, Jr. et al. . |
| 4,967,932 | 11/1990 | Wiley et al. . |
| 4,971,120 | 11/1990 | Credle, Jr. et al. . |
| 4,978,032 | 12/1990 | Newman et al. ........................ 221/121 |
| 4,989,753 | 2/1991 | Brogna et al. . |
| 5,000,345 | 3/1991 | Brogna et al. ............................... 221/5 |
| 5,058,630 | 10/1991 | Wiley et al. . |
| 5,072,859 | 12/1991 | Wiley et al. . |
| 5,400,838 | 3/1995 | Schjerven et al. . |

FOREIGN PATENT DOCUMENTS

| | | |
|---|---|---|
| 0 051 105A | 5/1982 | European Pat. Off. . |
| 0 806 380A | 11/1997 | European Pat. Off. . |
| 2629047 | 9/1989 | France . |
| 2191767A | 12/1997 | United Kingdom . |

OTHER PUBLICATIONS

Abstract of French publication 2,629,047, Marius Trouillet, Sep. 29, 1989, Derwent Publications Ltd., 1989.

*Primary Examiner*—Kenneth W. Noland
*Attorney, Agent, or Firm*—Finnegan, Henderson, Farabow, Garrett & Dunner, L.L.P.

[57] ABSTRACT

An automated system for preparing and delivering postmix beverages in response to one or more drink orders being entered from a remote point of sale unit or a local keypad and including: a postmix beverage preparation assembly for dispensing ice and a selected postmix beverage into a cup; an oblong carousel type conveyor assembly including a plurality of upwardly open cup holders which are driven by a motor driven belt so as to pass beneath a cup dispensing station, an ice dispensing station, a beverage dispensing station, and a plurality of pick-up stations; a cup storage and dispenser assembly including a bi-directionally rotatable turret upon which is mounted a plurality of different sized cup supply tubes for holding a respective stack of beverage cups; and a pneumatic vertically driven cup gripper/extractor mechanism having a pair of pneumatically operated gripper arms which operate to remove a cup from a selected supply tube on the turret and placing the extracted cup into an empty cup holder which is then transported past the dispensing stations and then to a pick-up station on the conveyor for manual removal by an attendant.

21 Claims, 28 Drawing Sheets

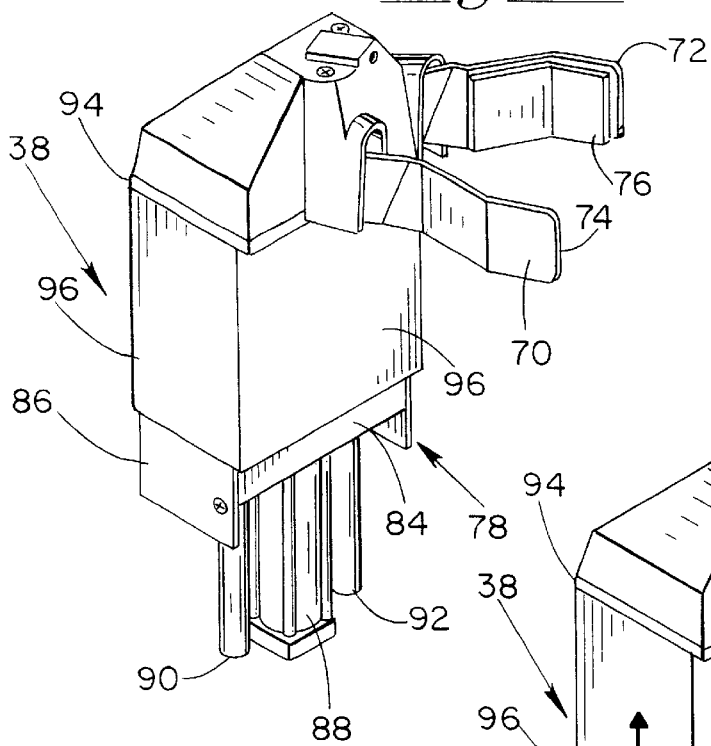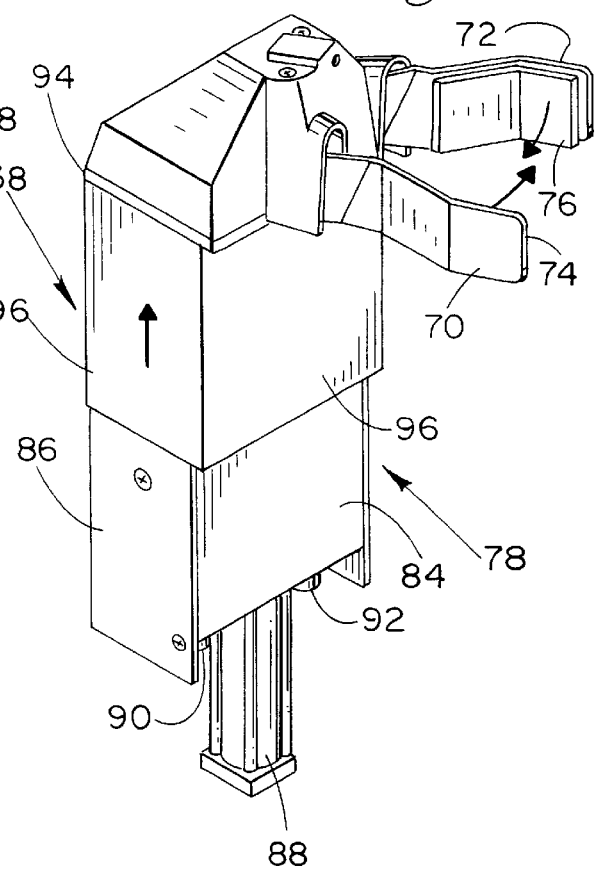

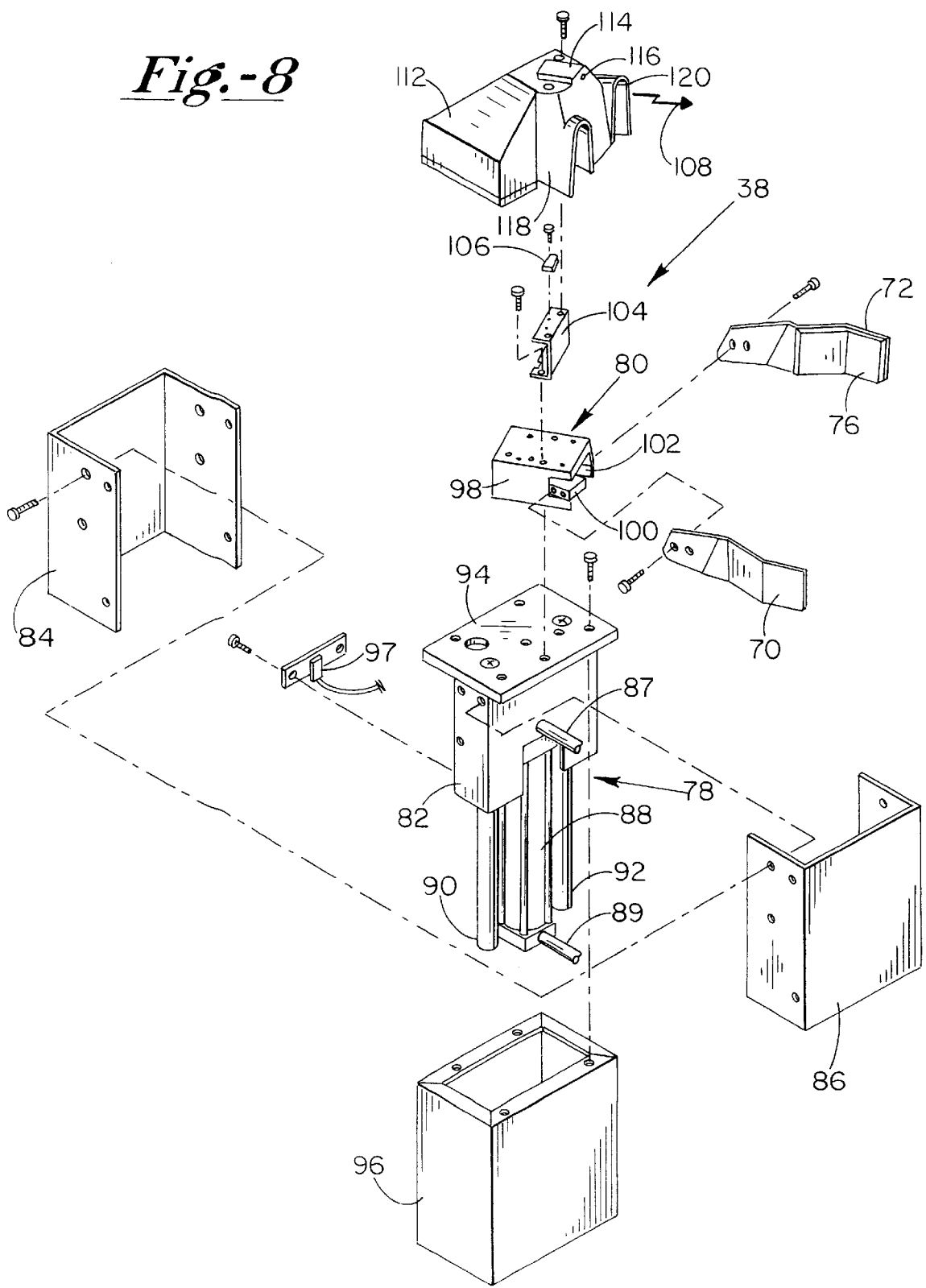

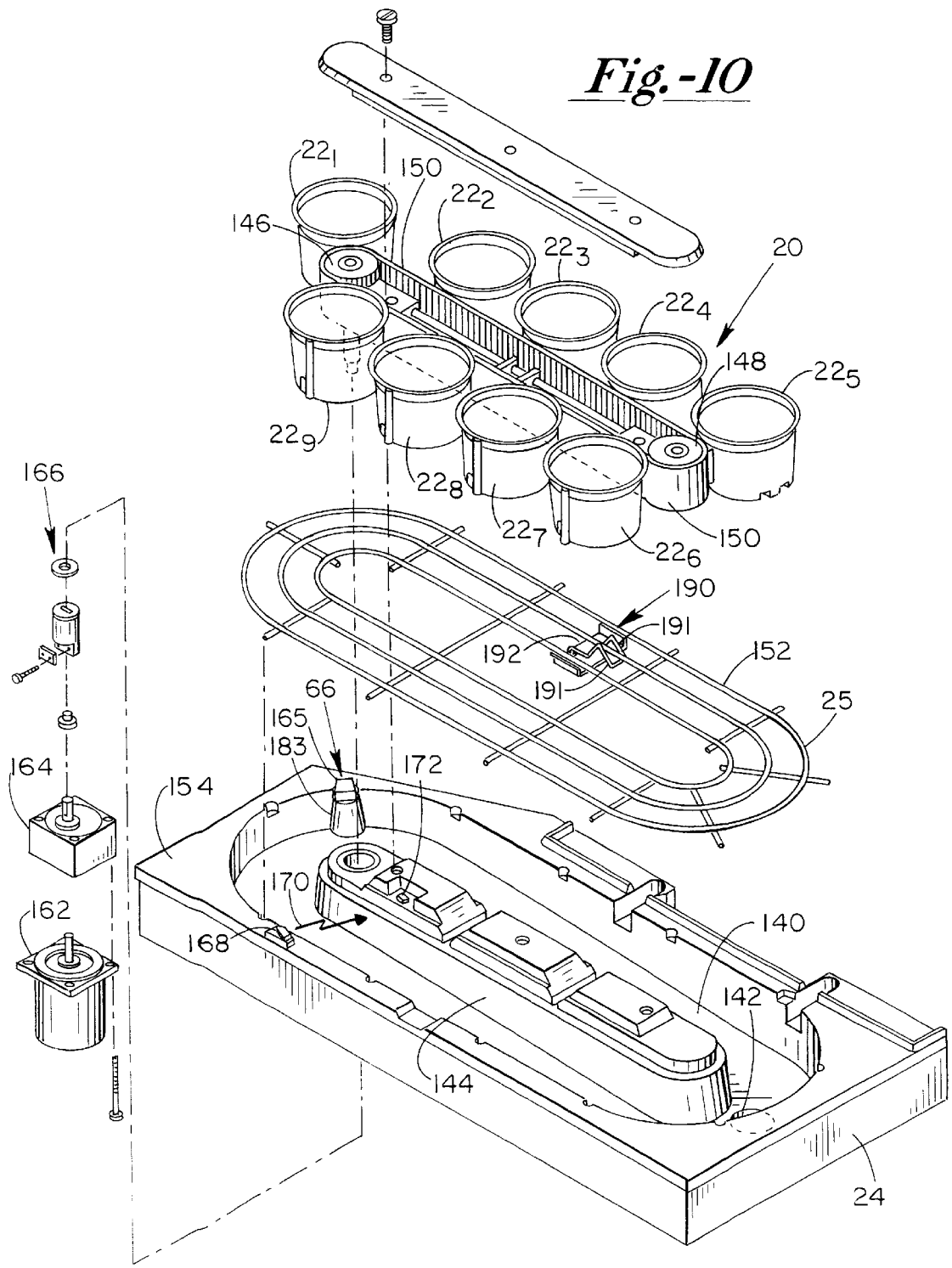

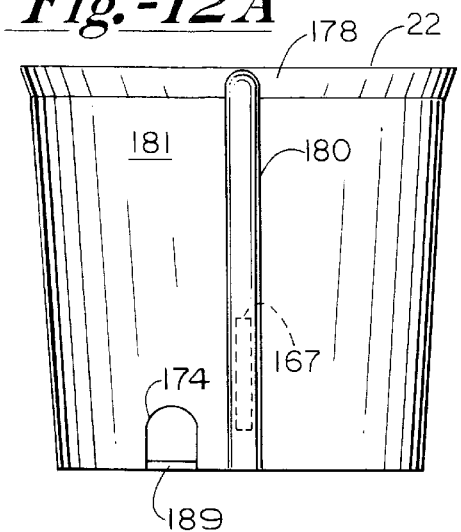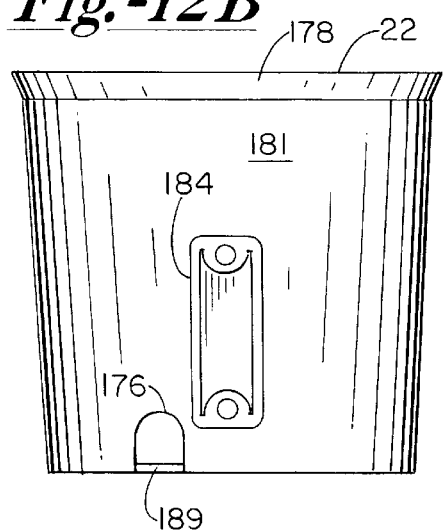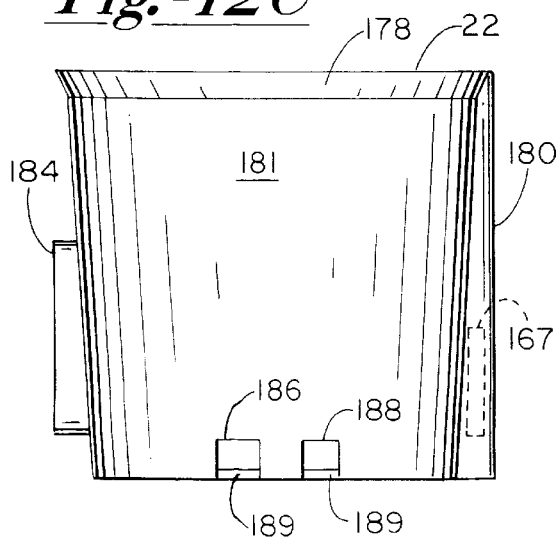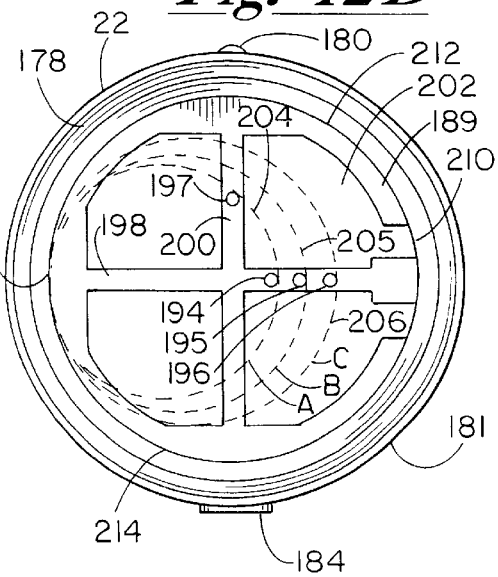

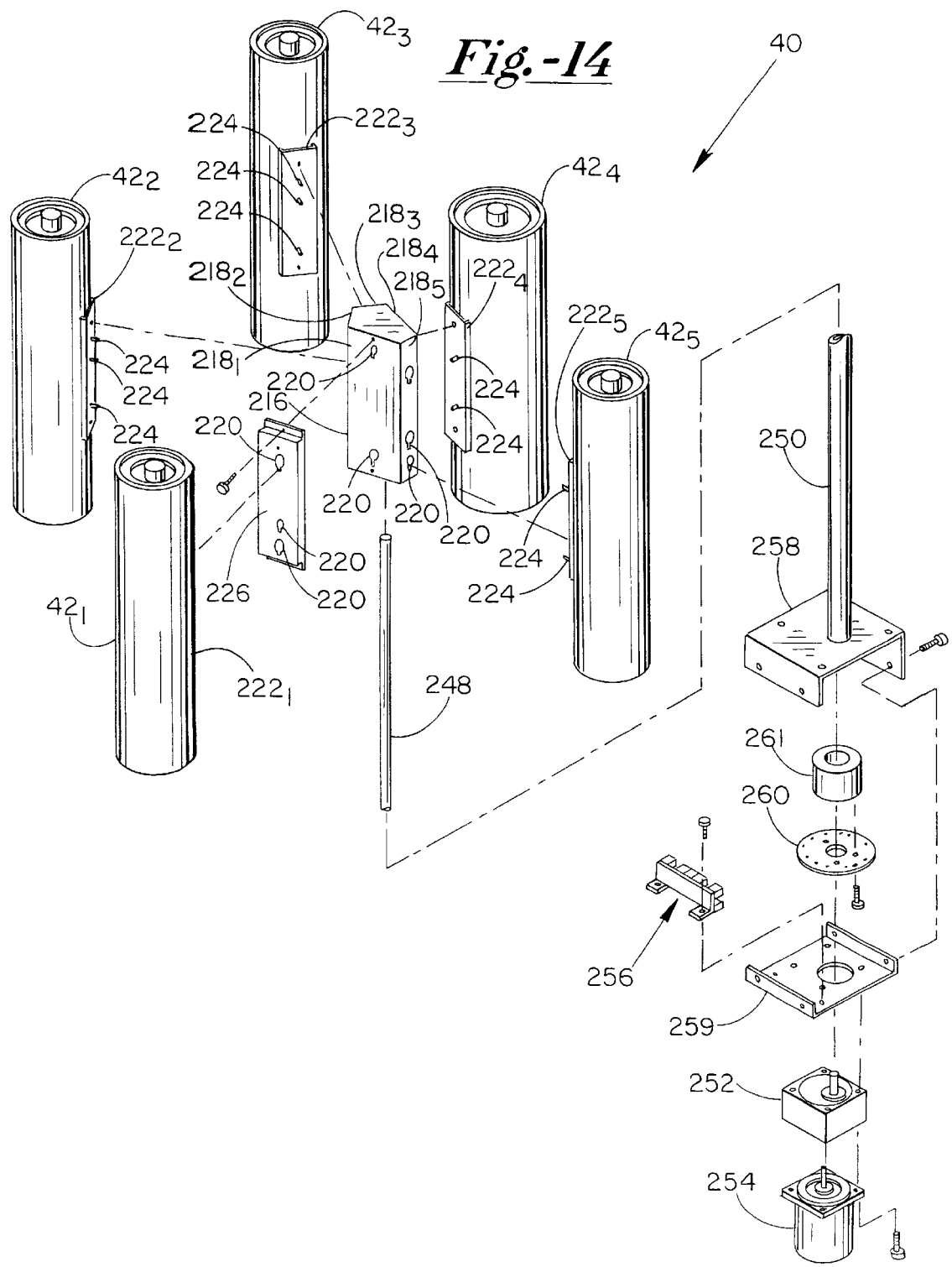

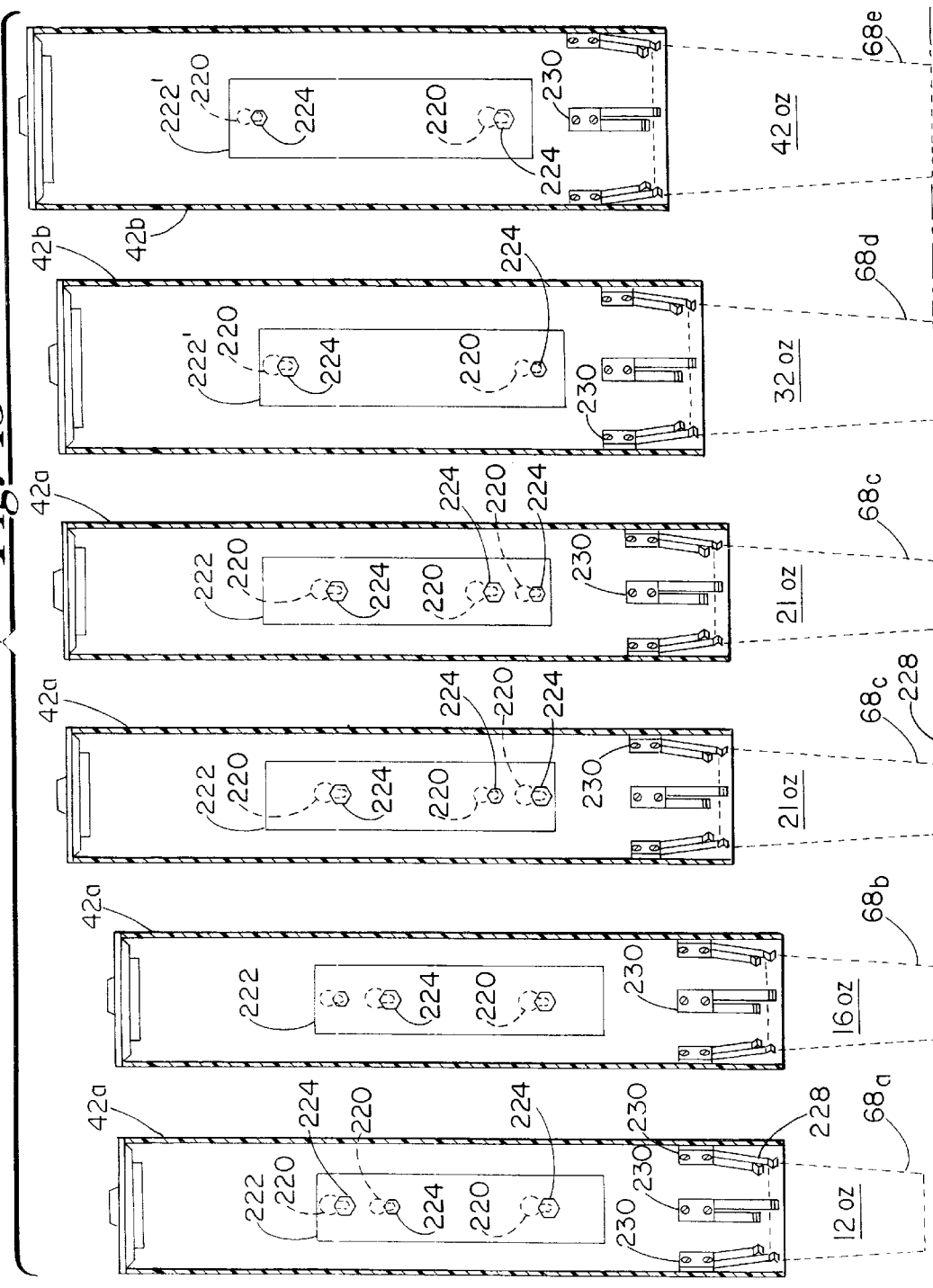

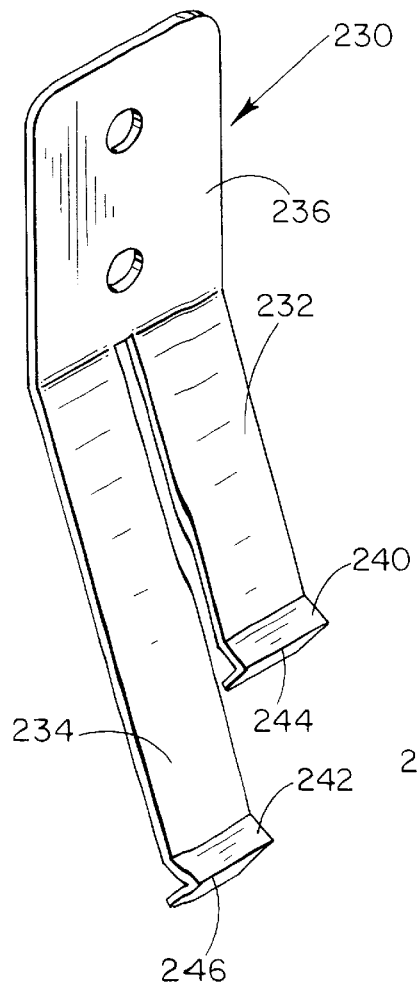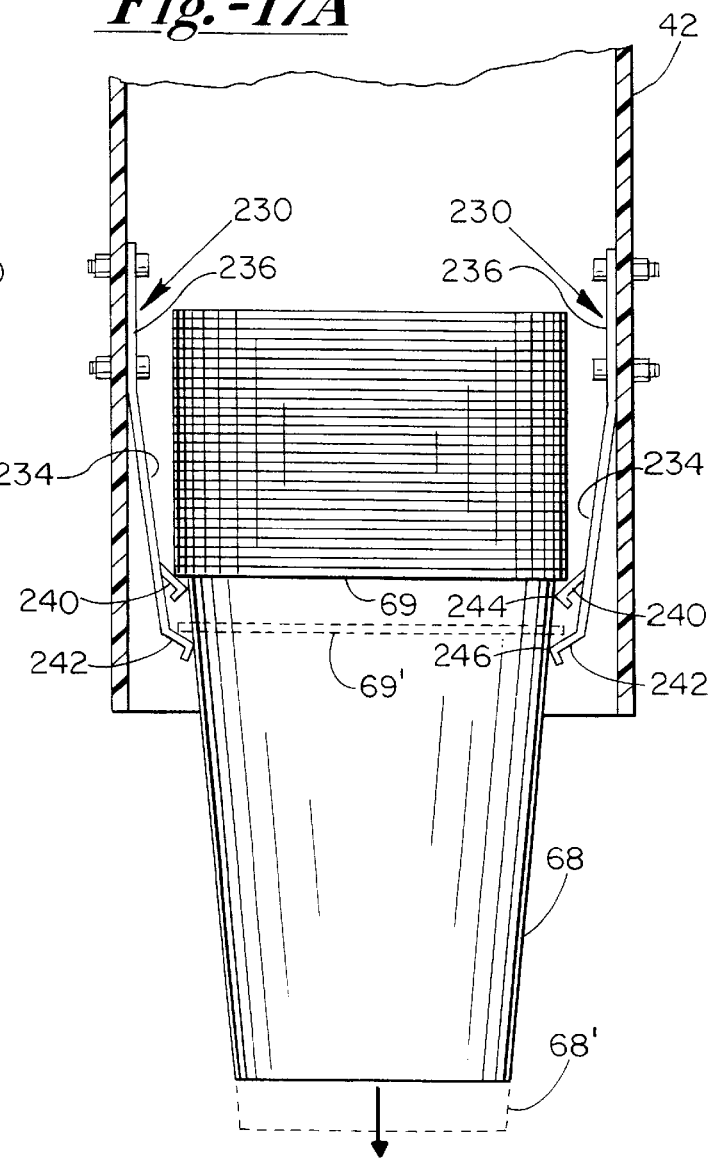

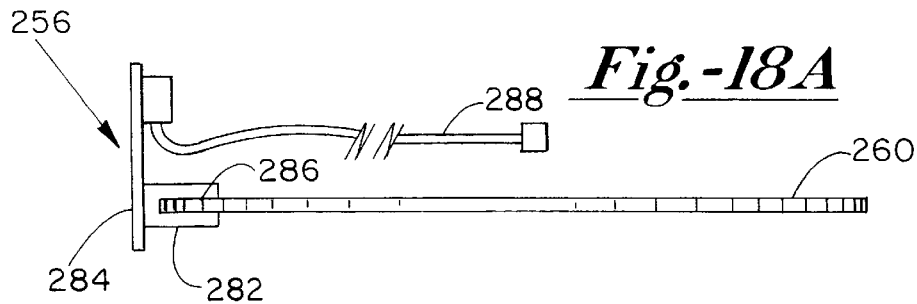
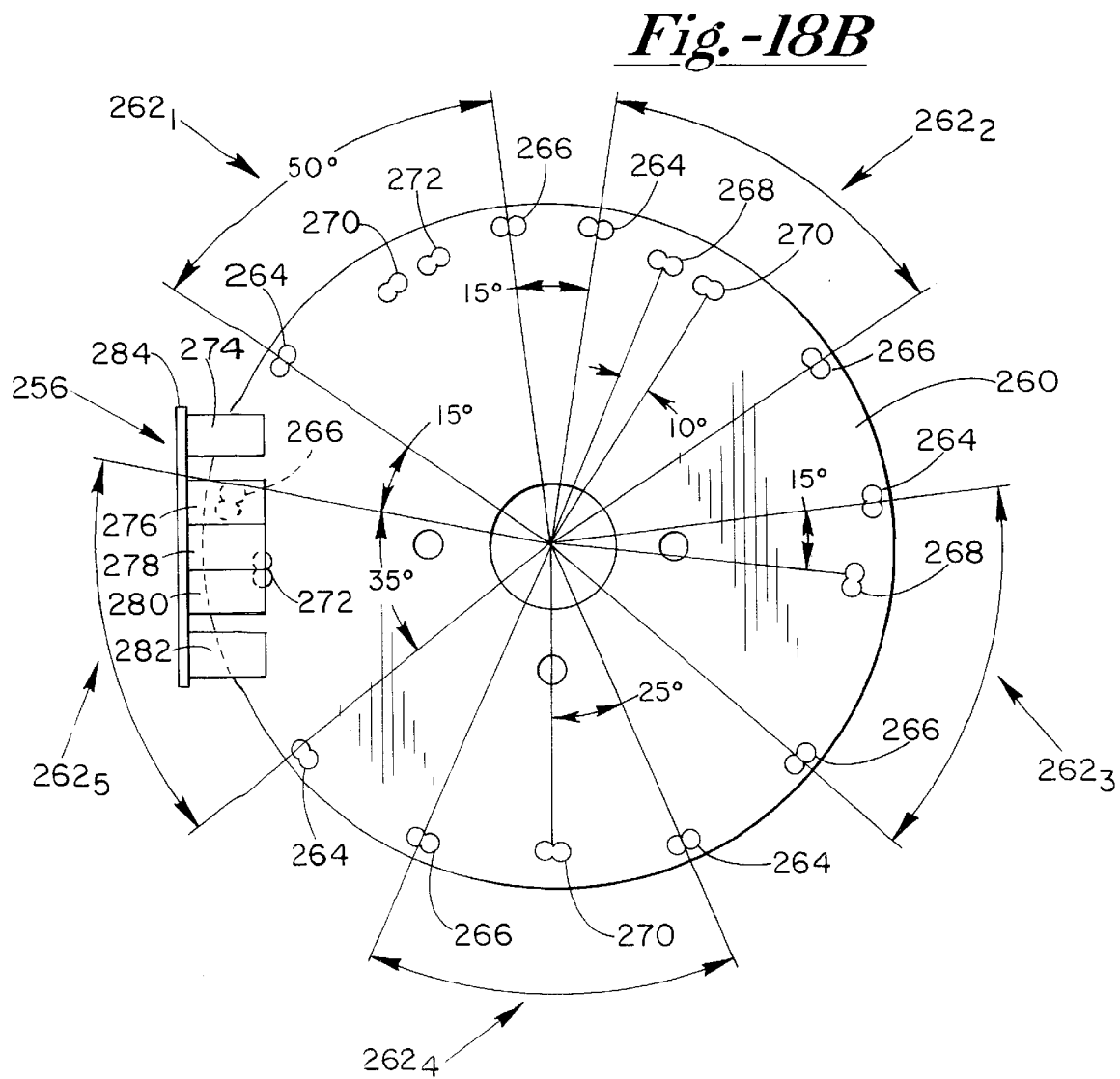

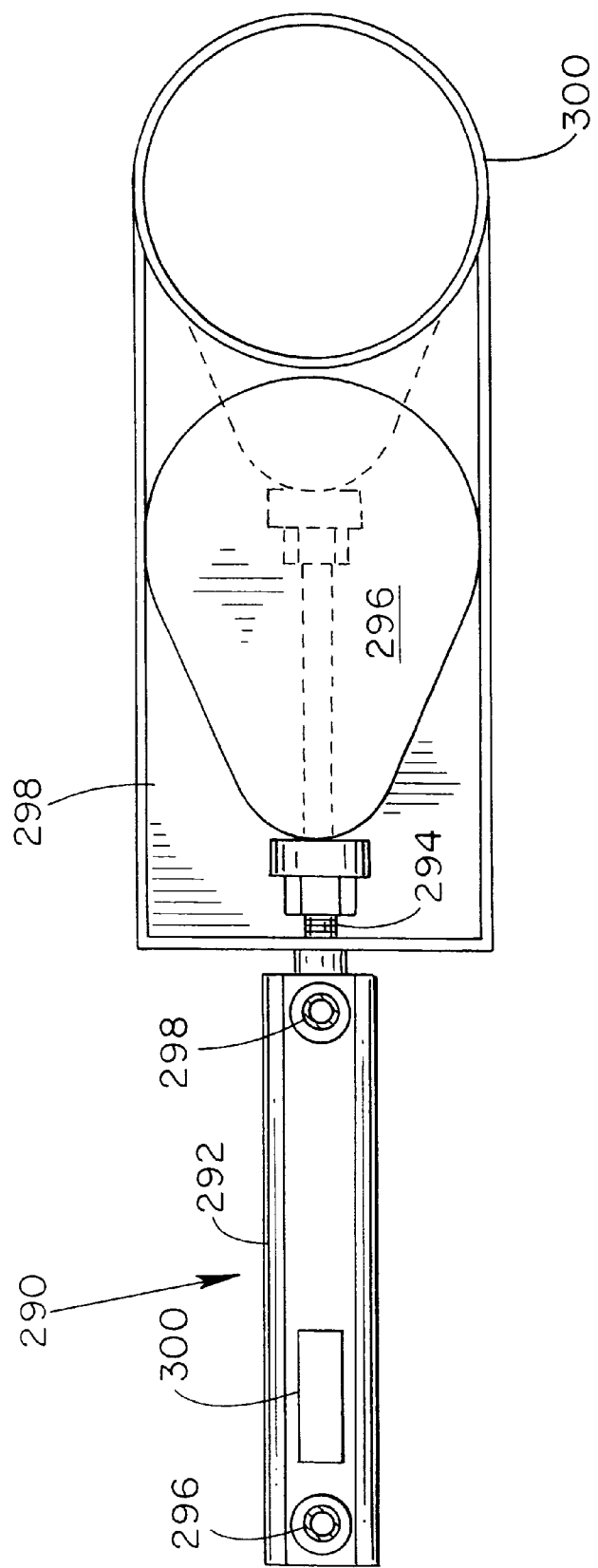

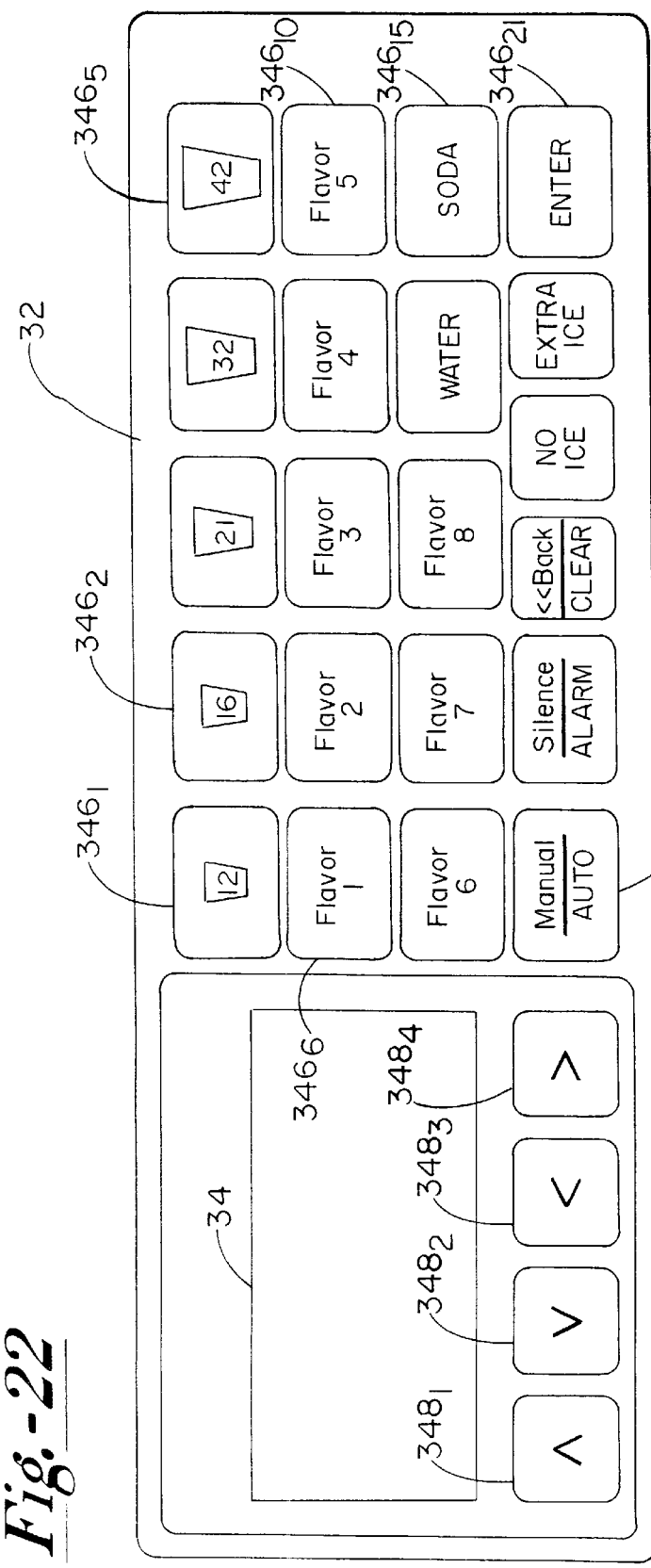

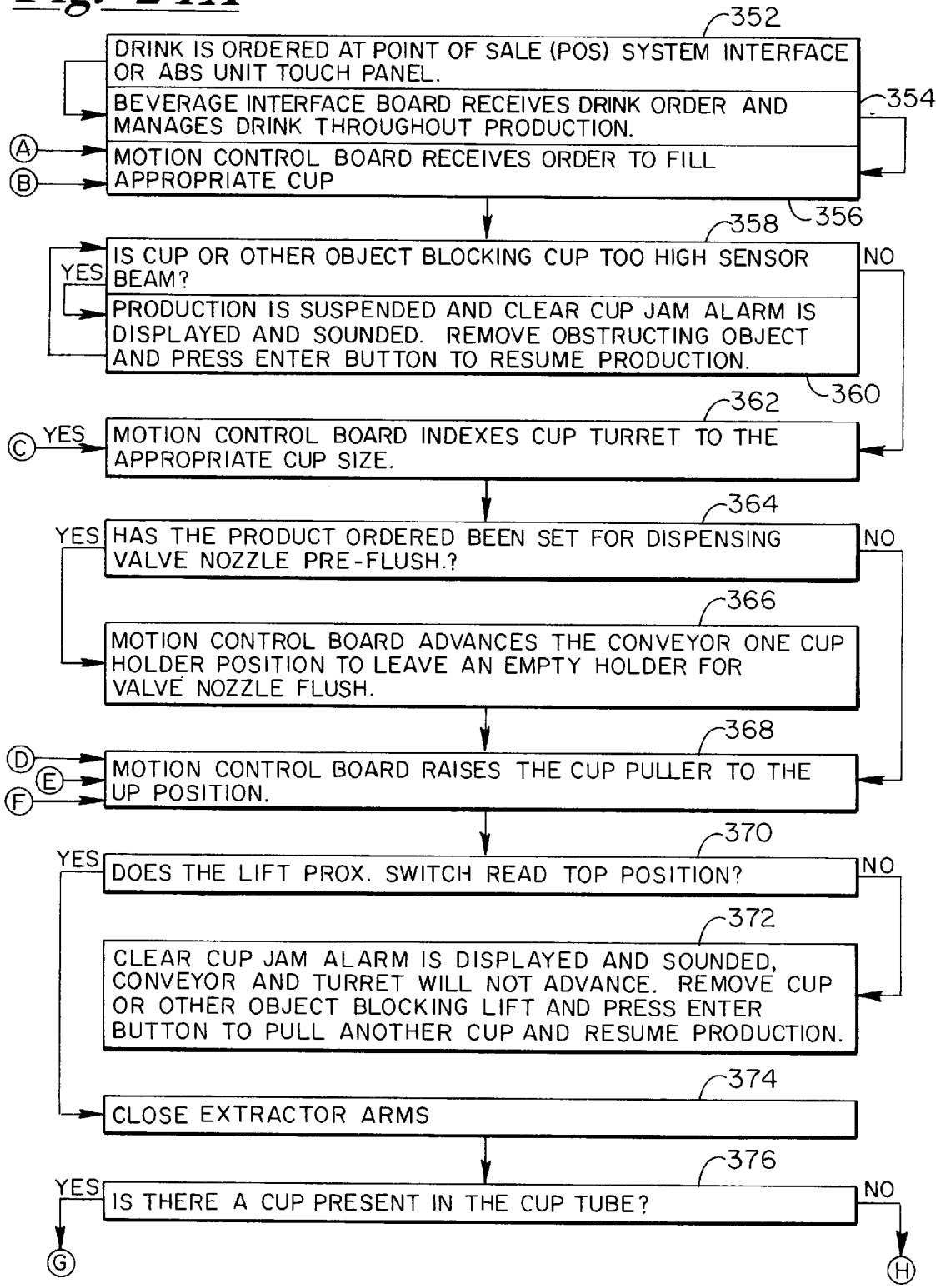

AUTOMATED BEVERAGE SYSTEM

This is a division of application Ser. No. 08/996,237, filed Dec. 22, 1997, which is incorporated herein by reference.

BACKGROUND OF THE INVENTION

1. Field of the Invention

This invention relates generally to postmix beverage dispensing systems and more particularly to an automated postmix beverage dispensing system for use with a remote point of sale unit and/or a local front control panel whereby beverage orders of different flavors and sizes are automatically filled and delivered to a pick-up station, with all of the various system functions being programmable depending on the needs of the user.

2. Description of Related Art

Automated systems for dispensing beverages are generally known and include, inter alia, apparatus whereby cups are automatically placed on a moving conveyor, which thereafter travel past an ice dispenser, followed by a selective beverage dispenser and finally to a beverage pick-up station.

Typical examples of such apparatus include automatic beverage dispensing systems shown and described in: U.S. Pat. No. 3,364,959, "Beverage Dispenser", H. Herman et al, Jan. 23, 1968; U.S. Pat. No. 4,590,975, "Automatic Beverage Dispensing System", William S. Credle, Jr., May 27, 1986; U.S. Pat. No. 4,944,337, "Automatic Beverage Dispensing System With Plural Conveyors", William S. Credle, Jr. et al, Jul. 31, 1990; U.S. Pat. No. 4,951,719, "Automatic Postmix Beverage Dispensing System With Flavor Indicators", Ronald L. Wiley et al, Aug. 28, 1990; and U.S. Pat. No. 5,058,630, "Automatic Beverage Dispensing System With Programmable Cup Drop", Ronald L. Wiley et al, Oct. 22, 1991.

There is, however, an ongoing need for improvements in such systems.

Accordingly, it is an object of the present invention to provide an improvement in automated postmix beverage dispensing systems.

It is a further object of the present invention to provide an improvement in cup dispensing apparatus for delivering a cup of a predetermined selected size from a plurality of different sized supply tubes to an extractor mechanism positioned adjacent a conveyor.

It is another object of the invention to provide an automated beverage dispensing system which includes an improvement in apparatus for extracting a beverage cup of an appropriate size from a cup supply tube and then positioning the cup on a conveyor.

It is yet another object of the invention to provide an improvement in gripper type apparatus for extracting a beverage cup from a cup supply tube and dropping an extracted cup into a cup holder located on the conveyor.

It is yet a further object of the invention to provide an improvement in means for automatically positioning a dropped cup in a cup holder located on the conveyor by an extractor/gripper device.

It is still a further object of the invention to provide an automated system which is designed to leave a cup holder position vacant, when desirable, for serving as a marker between beverage orders.

It is still another object of the invention to provide an improvement in automated postmix beverage dispensing systems which is controlled by a programmable controller.

SUMMARY OF THE INVENTION

The foregoing and other objects are fulfilled by an automated system for preparing and delivering postmix beverages to a pick up station, and comprising: a postmix beverage preparation assembly for dispensing ice and a selected postmix beverage into a cup; a carousel type conveyor assembly including a plurality of upwardly open cup holders which are driven by a motor driven belt so as to pass beneath a cup dispensing station, an ice dispensing station, a beverage dispensing station, and a plurality of pick-up stations; a cup holder and dispenser assembly including a bi-directionally rotatable turret upon which is mounted a plurality of different sized cup supply tubes for holding a respective stack of beverage cups; a pneumatic vertically driven cup gripper/extractor mechanism having a pair of pneumatically operated gripper arms which operate to remove the lowermost cup from a selected supply tube on the turret and placing the cup into an empty cup holder positioned threat; a display unit which, among other things, identifies the prepared beverage(s) delivered at a plurality of pick-up stations; and, a programmable controller for controlling the overall operation of the system.

The controller operates the ice and beverage dispenser, the conveyor, the cup dispenser and the cup extractor in response to signals input thereto from either a point of sale (POS) unit or by a local attendant so as to place an empty cup of a correct size for a selected order into a cup holder, move the cup holder successively under an ice chute and a beverage dispensing valve assembly, dispensing the appropriate amount of ice and beverage into the cup, and thereafter moving the filled cup to one of a plurality of the pick-up stations.

The controller, moreover, is programmed to prepare an order consisting of several beverages which may be of different flavors and sizes and may, if desired, leave an empty cup holder between successive holders which serves to provide for a dispensing value pre-flushing interval and/or act as a marker delineating the last-filled cup of one order and the first-filled cup of the following order.

The present cup turret position is sensed and is operated so as to rotate in a direction which minimizes the travel time required for positioning a selected cup supply tube over a cup holder on the conveyor. Each cup supply tube, moreover, includes a plurality of bifurcated cup restraining members located at the opening in the bottom for holding a stack of cups in position for selective extraction.

Each cup holder also includes an open bottom portion including a web containing a set of cup positioning barbs which holds an empty cup against the side wall of the cup in response to a positioning inner action provided by a spring element located under the conveyor, and extending upwardly through the web of the cup holder prior to its coming into position under the ice chute.

Further scope of applicability of the present invention will become apparent from the detailed description provided hereinafter. It should be noted, however, that the detailed description of the preferred embodiment of the invention provided herein is made for purposes of illustration and not limitation. This is due to the fact that various changes and modifications coming within the spirit and scope of the invention will become apparent to those skilled in the art.

BRIEF DESCRIPTION OF THE DRAWINGS

The present invention will become more fully understood when considered together with the accompanying drawings, wherein:

FIGS. 7A and 7B are respective views generally illustrative of the gripper/extractor mechanism shown in FIG. 6 in the rest and elevated positions, respectively;

FIG. 8 is an exploded perspective view illustrative of the parts in the gripper/extractor mechanism shown in FIGS. 7A and 7B;

FIG. 10 is an exploded perspective view illustrative of the conveyor assembly shown in FIG. 6;

FIGS. 12A–12D are four different views of one of the cup holders forming part of the conveyor assembly shown in FIGS. 10 and 11;

FIG. 14 is an exploded view illustrative of the turret type cup supply tube assembly shown in FIGS. 1–5;

FIGS. 15 is a set of central longitudinal cross sectional views illustrative of various sized cup supply tubes utilized with the supply tube assembly shown in FIG. 14;

FIG. 16 is a perspective view generally illustrative of one of the bifurcated cup restrainers located in the bottom portion of the cup supply tubes shown in FIG. 15;

FIGS. 17A and 17B are partial cross sectional views illustrative of the operation of the cup supply tubes shown in FIG. 15;

FIGS. 18A and 18B are side elevational and top elevational views, respectively, of turret position detector in the cup dispenser sub-assembly shown in FIG. 11;

FIGS. 20A and 20B are exploded perspective view and top elevational views of the ice gate sub-assembly included in the preferred embodiment of the subject invention;

FIG. 22 is a diagram illustrative of the control panel shown on the embodiment of the invention in FIG. 1;

FIG. 23 is a diagram illustrative of the drink delivery display located on the embodiment of the invention shown in FIG. 1; and FIGS. 24A–24C depict a flow chart illustrative of the overall system operation of the subject invention.

DETAILED DESCRIPTION OF THE PREFERRED EMBODIMENT

Figure 1:
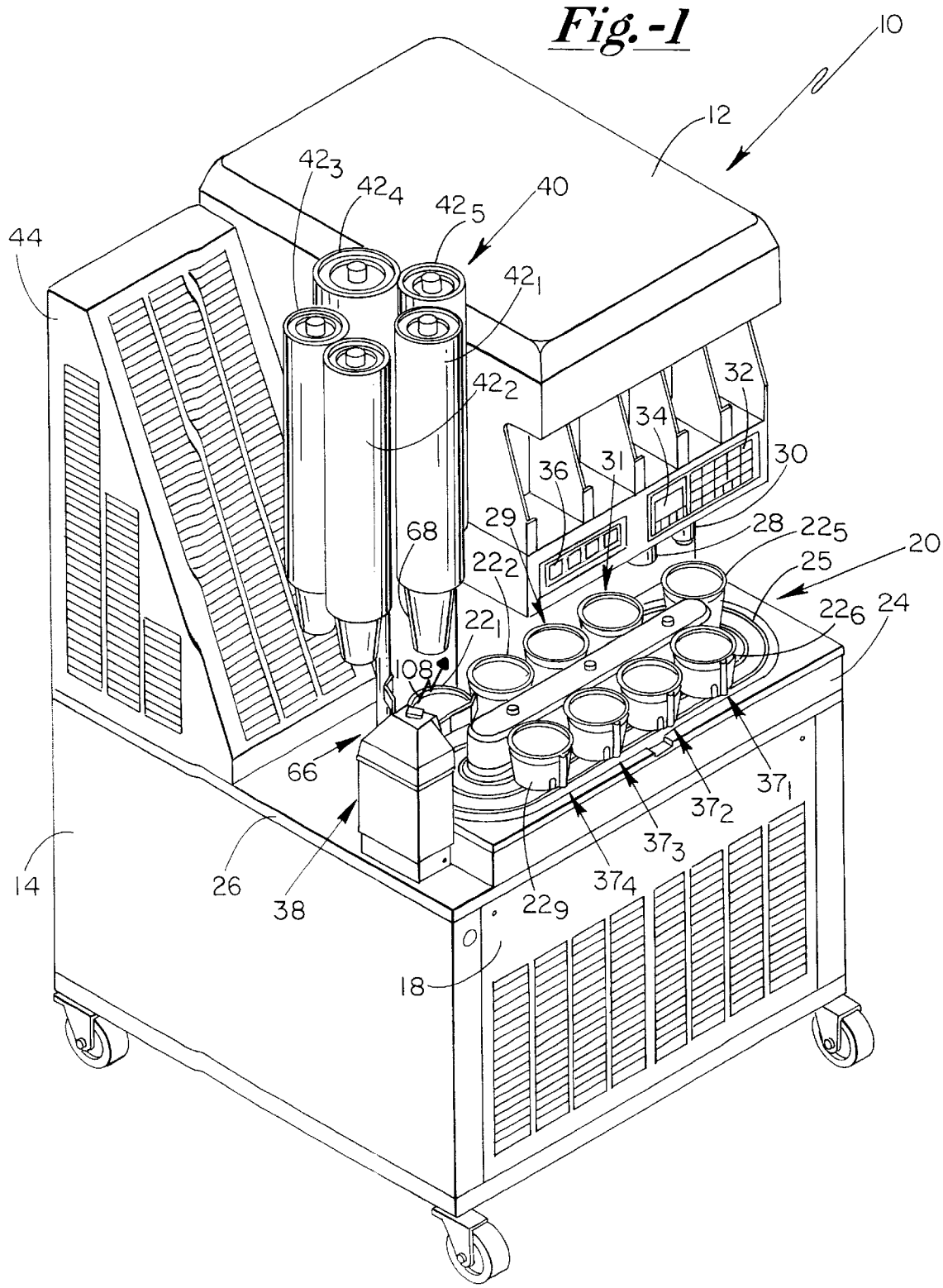
FIG. 1 is a perspective view generally illustrative of the preferred embodiment of the invention.

Referring now to the drawings, wherein like reference numerals refer to like parts throughout, and more particularly to FIGS. 1–5, reference numeral 10 denotes a system cabinet including an ice and post-mix beverage delivery unit 12 below which is a bottom section 14 for housing a control unit, not shown, and a refrigeration unit 16, shown in FIG. 5, which is protected by louvered cover 18. The refrigeration unit 16 is of the ice bank type, well known in the art, having an evaporator submerged in water within a water bank tank, around which evaporator a volume of ice is formed by operation of an electromechanical refrigeration system.

Above the bottom section 14 of the cabinet 10 is an ovular or oblong motor driven carousel type of conveyor assembly 20. The conveyor 20 includes nine(9) beverage cup holders $22_1 \ldots 22_9$, which normally move in a clockwise direction over an oval track 25 having parallel sides and rounded end sections, and which resides in a moulded generally rectangular drip tray 24, shown in detail at FIG. 10, for catching any spilled ice and beverage. The drip tray 24, which is located on the front portion of a flat plate 26, also acts to close off for the lower section 14 of the cabinet.

The ice and beverage delivery unit 12 extends out over the conveyor 20 and includes an ice delivery chute 28 at an ice dispensing station 29 and a beverage dispensing valve and nozzle assembly 30 at a beverage dispensing station 31. Just above the ice chute 28 and beverage delivery nozzle assembly 30, is a front control panel 32 which may be, for example, a touch panel for locally inputting a drink order as well as programming the system for selecting drink combinations.

The panel 32 also includes a visual display section 34. To the left of the panel 32 is a display unit 36 which is adapted to display the type of beverage which is being delivered and located at the four(4) linear pick-up stations $37_1$, $37_2$, $37_3$ and $37_4$ at the front of the conveyor 20.

To the left side of the conveyor assembly 20 is a cup gripper and extractor mechanism 38. Located behind and to the right of the gripper and extractor mechanism 38 is a turret type cup storage unit 40, including five(5) cup supply tubes $42_1$, $42_2 \ldots 42_5$ of various sizes. The details of this apparatus will be subsequently considered in detail.

Figure 5:
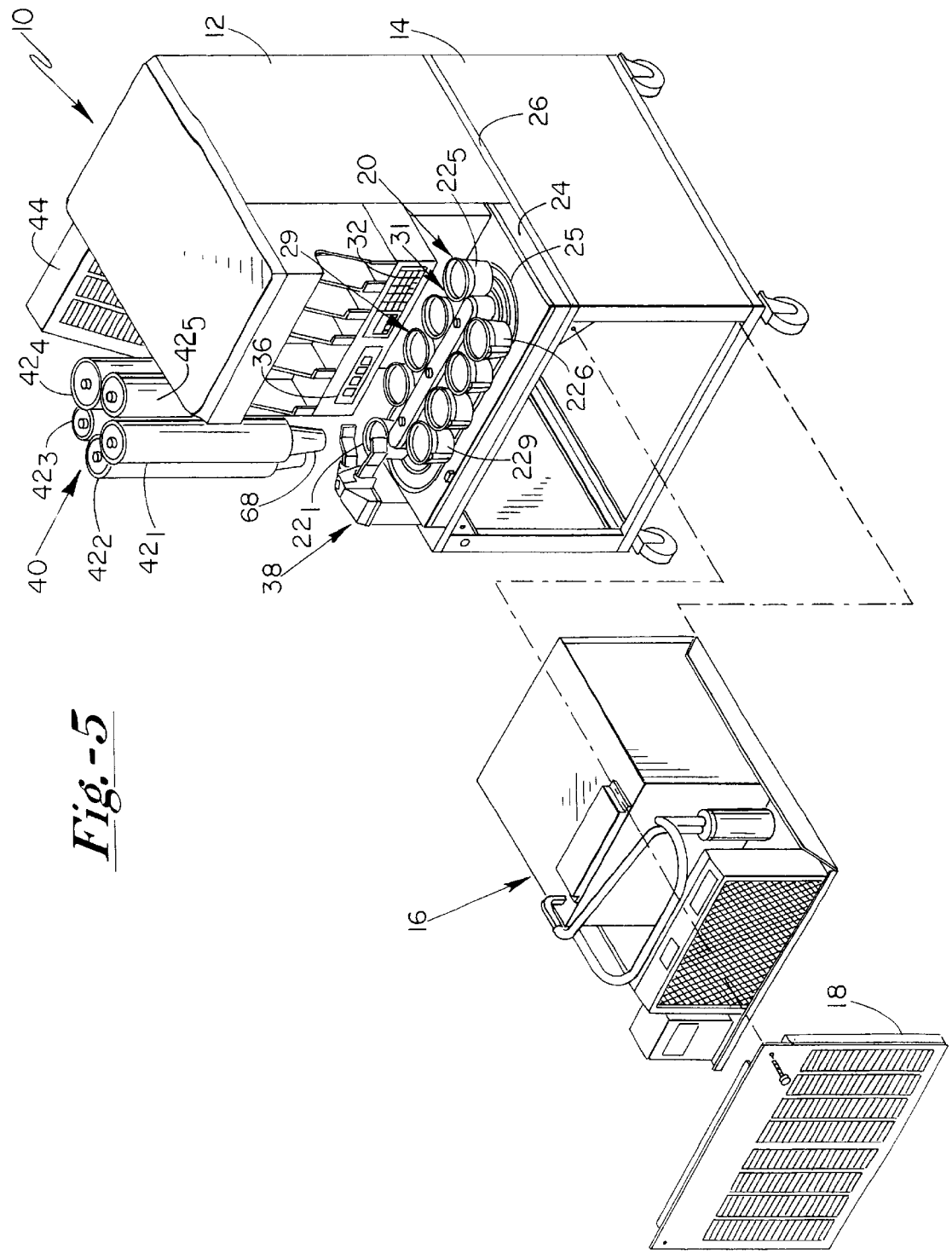
FIG. 5 is an exploded perspective view further illustrative of the embodiment of the invention shown in FIG. 1.

The section 44 of the cabinet 10 directly behind the cup storage unit 40 comprises a louvered housing for providing ventilation to the interior of the cabinet 10 including the dispensing apparatus, not shown, as well as the refrigeration unit 16 (FIG. 5).

Figure 4:
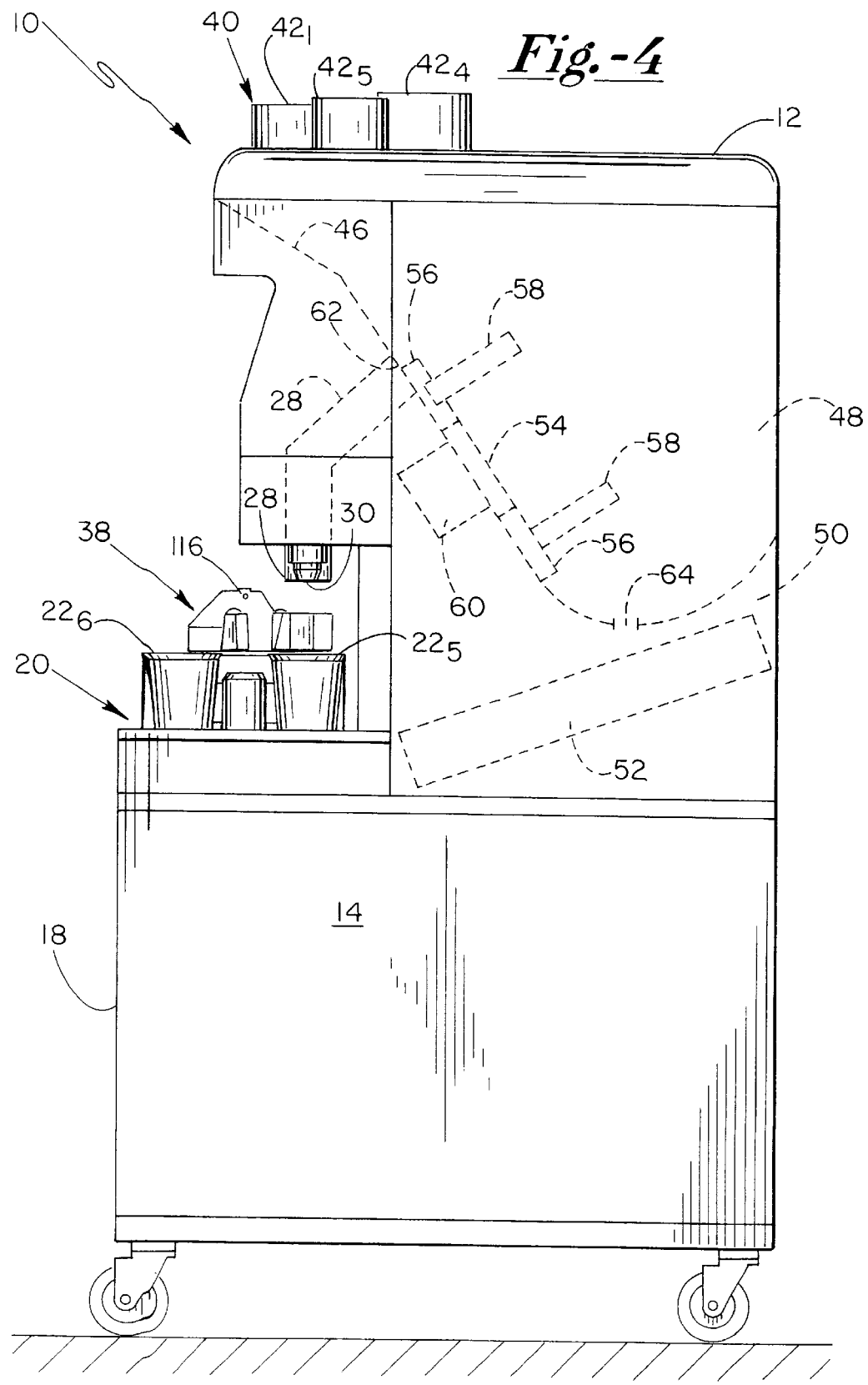
FIG. 4 is a side elevational view of the embodiment of the invention shown in FIG. 1.

Considering now the details of the preferred embodiment of the invention, the upper portion 12 of the cabinet 10 includes, as shown in FIG. 4, a plastic liner 46 which divides the interior of the unit into an upper ice bin area 48, and a lower cold plate area 50. The cold plate area 50 includes a cold plate 52 through which a plurality of heat exchange lines, not shown, extend. A plurality of beverage delivery lines, also not shown, provide for delivery of beverages from sources thereof, also not shown, to the water bath of refrigeration unit 16. Stainless steel heat exchange portions of those beverage lines extend through the water bath tank thereof for cooling of the beverage contents flowing therethrough. The beverage delivery lines then flow to, and are fluidly connected with, the plurality of cold plate heat exchange lines. Outlets of the cold plate heat exchange lines are, in turn, connected to the multi-flavor beverage dispensing valve 30, which may be, for example, a multi-flavor valve which is manufactured by McCann Engineering and Manufacturing Company, Los Angeles, Calif. Thus, it will be appreciated by those skilled in the art that the dispenser herein provides two means for cooling the beverages, namely; by heat exchange with ice on the cold plate 52 and by heat exchange with the cooled water in the water bath tank of refrigeration unit 16. As a result, the beverage cooling capacity, or volume of drink that can be cooled to a desired serving temperature per unit of time, by the automatic beverage dispenser of the present invention, is enhanced. This redundancy in cooling systems provides a means for satisfactorily cooling drinks and continuing operation should one or the other of the cooling system become inoperative or determined to be unneeded.

An ice delivery mechanism located in the ice bin area 48 includes a wheel 54 which includes a plurality of ice scoops or paddles 56 extending from the outer perimeter thereof. The wheel 54, moreover, includes a set of auger bars 58 extending outwardly therefrom. A motor shown by reference numeral 60 is used to drive the wheel 54. Further as shown in FIG. 4, the ice chute 30 is shown extending downwardly from a hole 62 in the liner 46.

When ice is loaded into the ice bin area 48, rotation of the wheel 54 by the motor 60 causes the paddle 56 to deliver ice to the hole 62 and then into the ice chute 30. The set of auger bars 58 serve to break the ice in the bin 48 should any melting and refreezing thereof occur. Also, rotation of the wheel 54 causes ice to fall by gravity into the cold plate area 50 by means of a hole 64 formed in the bottom portion of the liner 46. The ice in the cold plate area 50 serves to chill the cold plate 52 so as to provide for heat exchange cooling of beverages being routed through the cold plate 52 to the dispensing valve and nozzle assembly 30.

Figure 6:
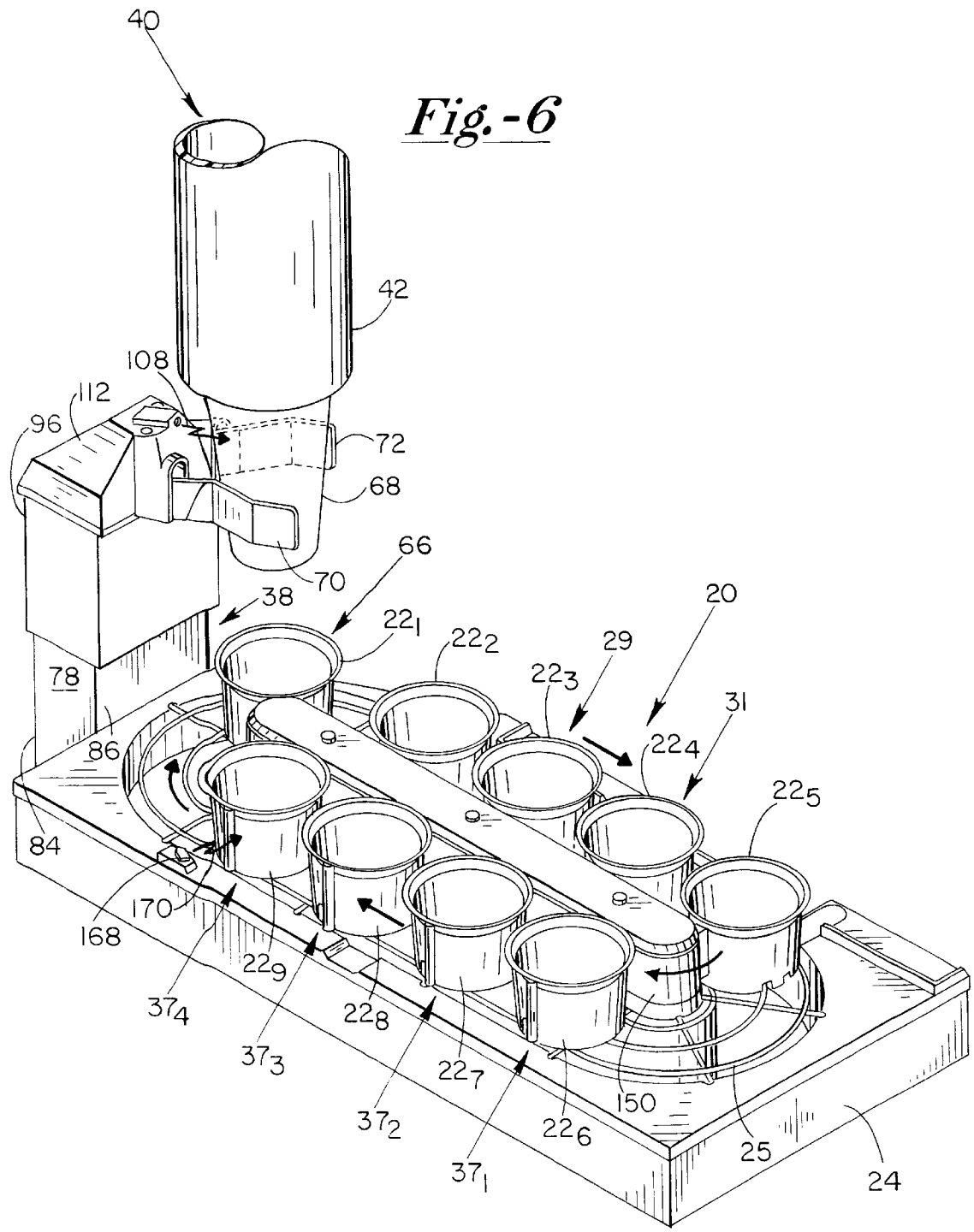
FIG. 6 is a perspective view illustrative of the conveyor assembly and gripper/extractor mechanism shown in FIGS. 1–5.

Referring now to the conveyor assembly 20 and more particularly to FIG. 6, shown threat, is the set of cup holders 22₁ . . . 22₉ located thereon being driven in a clockwise direction. One of the cup holders 22₁ is located at a cup extraction station 66 at one end directly beneath one of the five(5) cup supply tubes 42₁ . . . 42₅ of the cup storage unit 40. Further as shown in FIG. 6, a beverage cup 68 is being grasped by a pair of angulated outstretched gripper arms 70 and 72 located on the top portion of the gripper and extractor mechanism 38. The gripper arms 70 and 72 are relatively wide, approximately 2 in in width, so as to grasp a large lower portion of the cup 68 near the rim at the bottom in order to prevent the cup from being crushed or otherwise damaged when grasped. As a further insurance, the gripper arms 70 and 72 also include relatively soft cup gripper pads 74 and 76 located on the outer inner ends thereof as shown in FIGS. 7A and 7B.

Figure 9A:
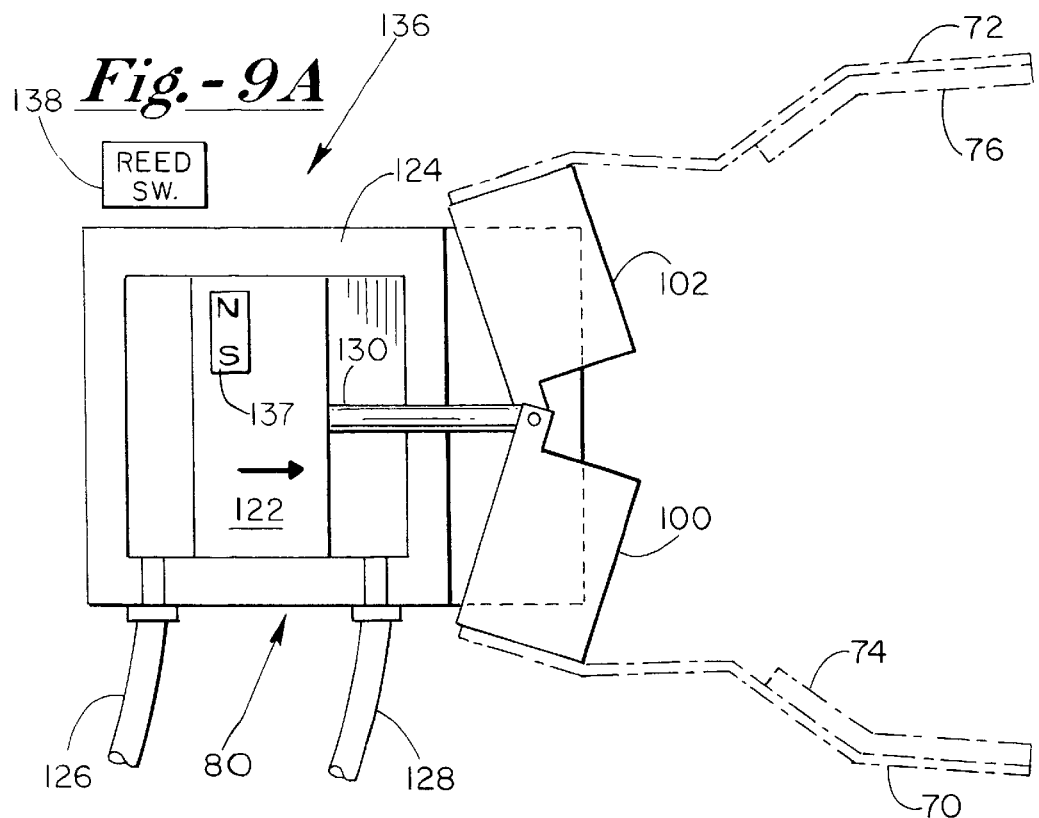
FIGS. 9A and 9B are diagrams illustrative of the operation of the cup gripping operation performed by the gripper/extractor mechanism shown in FIGS. 7A and 7B.
Figure 9B:
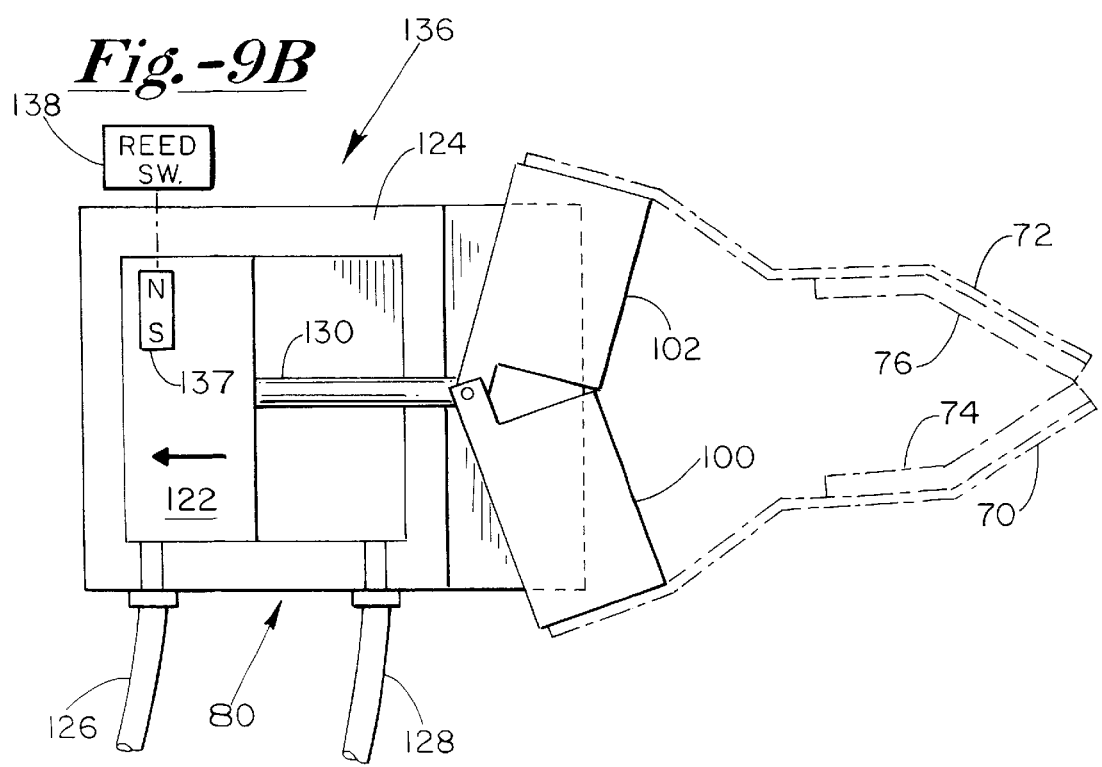

The gripper and extractor mechanism 38 comprises a pneumatically actuated assembly which is shown in FIG. 7A in a lowered or rest position, while in FIG. 7B, it is shown in an elevated or cup extracting position, where the gripper arms 70 and 72 partially close so as to grasp a cup 68 (FIG. 6). The raising and lowering operation and the grasping operation are achieved by two pneumatic piston subassemblies, the first of which 78 is shown in FIG. 8, and the second of which 80 is shown in FIGS. 9A and 9B.

In FIG. 8, the lifting sub-assembly 78 is shown including, among other things, a hollow stationary support block 82 attached, for example, to the side of the spill tray 24 as shown in FIG. 6 by a pair of fore and aft half cover plates 84 and 86. This structure houses and protects a pneumatic cylinder 88 including a pair of air supply hoses 87 and 89 and a pair of support rods 90 and 92. The cylinder 88 includes a drive position and a piston rod, not shown, attached to a vertically elevatable base plate 94, which is shown in the rest position of FIG. 7A, on top of the support block 82. A four sided metal housing 96 of rectangular cross section is secured to the underside of the baseplate 94. One part 94 of a magnetic reed switch type of proximity sensor is attached to the support block 82, while the other part, not shown, is attached to the plate 94 for detecting when the upper portion of gripper/extractor mechanism 38 is elevated and lowered.

On top of the base plate 94 there is located a gripper housing 98 containing a pair of pivot blocks 100 and 102 to which is attached the gripper arms 70 and 72. On top of the gripper housing 98 is a support bracket 104 on which is located an infrared (IR) light emitting element 106 which forms part of an IR sensor assembly for generating an IR beam 108 (FIG. 6) which passes under a cup supply tube 42 and across the cup drop path to an IR receptor 110 (FIG. 3) located on the cabinet housing 12 for detecting a cup jam, should one occur. At the cup extraction station 66, the IR beam 108 will be uninterrupted prior to a cup extraction operation but will become temporarily interrupted during cup extraction as shown in FIG. 6. However, during a cup jam in the supply tube 42, the IR beam 108 will be continuously interrupted until the jam is cleared.

A cover 112 is shown in FIG. 8 secured to the upper portion of the base plate 94 for protecting the gripper housing 98 as well as the IR emitter element 106. The cover 112 as shown, includes a raised section 114 for receiving the IR emitter element 106 and includes a small hole or aperture 116 through which the IR beam 108 exits out of the cover 112. The cover 112 additionally includes a pair of forward protruding openings 118 and 120 for the passage of the gripper arms 70 and 72 therethrough from the pivot blocks 100 and 102.

Referring now to the piston assembly 80 for actuating the gripper arms 70 and 72, as shown in FIGS. 9A and 9B, it basically includes a piston 122 located in a cylinder 124 having a pair of air supply lines 126 and 128 connected thereto for moving the piston 122 back and forth and thereby cause the piston rod 130 to pivot the blocks 100 and 102 to which the gripper arms 70 and 72 are attached, causing the gripper arms 70 and 72 to open and close as shown.

In addition to the elevation sensor referred to above, the gripper and extractor mechanism 38 also includes a sensor 136 for detecting when the gripper arms 70 and 72 are completely closed so as to provide an indication of an empty cup supply tube 40 during an extraction operation. This sensor 136 also comprises a magnetic reed switch type of proximity switch assembly. As shown in FIGS. 9A and 9B, a permanent magnet element 137 is located on the piston 122. The piston cylinder 124 is formed of diamagnetic material, e.g. aluminum and an external reed switch 138 is located at the rear thereof. As shown in FIG. 9A, when the gripper arms 70 and 72 are open, the piston 122 is moved forward. The reed switch 138 cannot be activated by the magnetic element 139. The reed switch 138, moreover, will also not be activated by a partial closure of the arms 70 and 72 which occurs when actually grasping a cup 68 as shown in FIG. 6. However, in absence of a cup 68, the gripper arms 70 and 72 will completely close as shown in FIG. 9B, whereupon the magnetic element 137 is moved adjacent the reed switch 138 which will then become activated.

Figure 11:
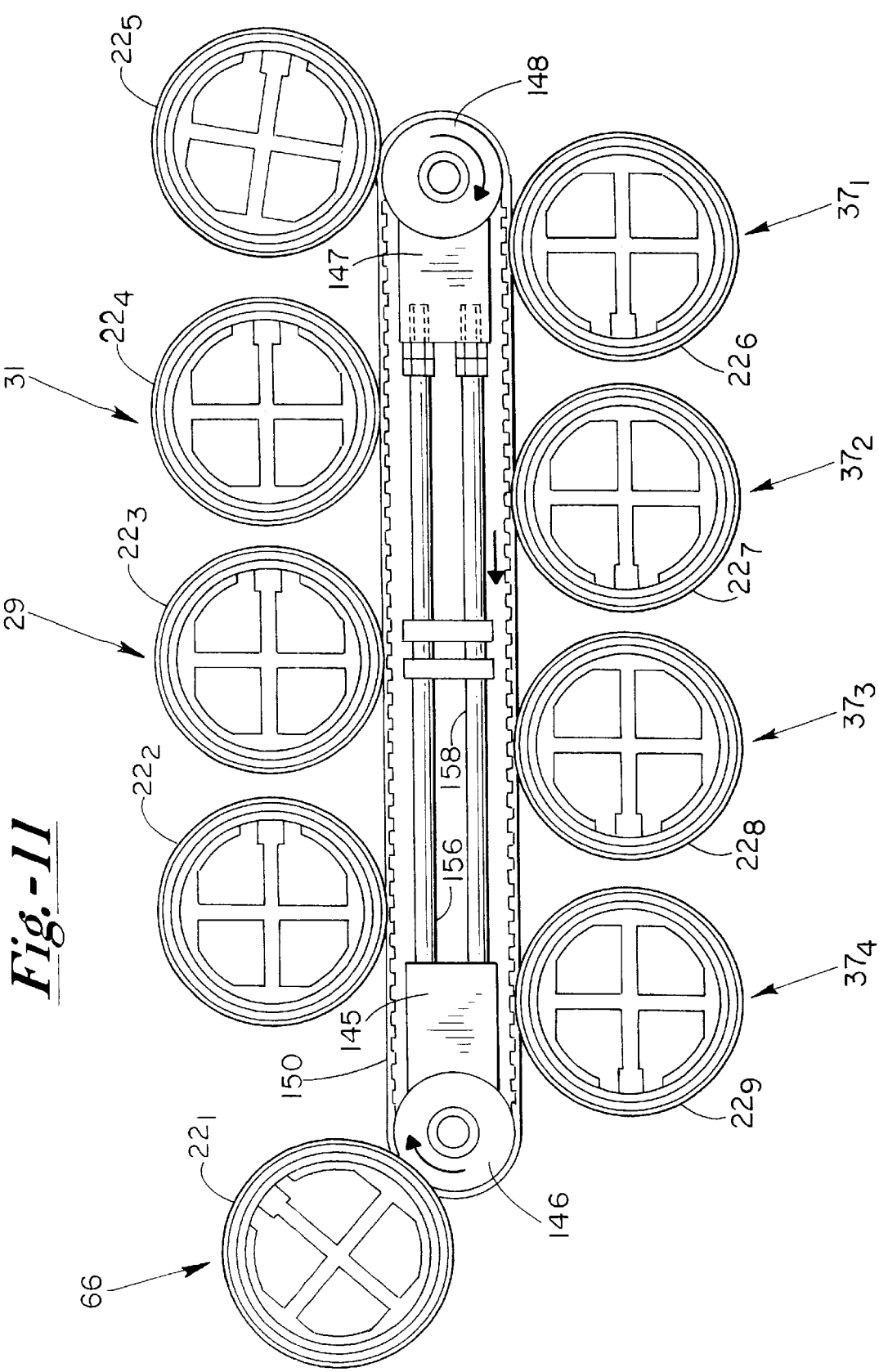
FIG. 11 is a top elevational view of the conveyor assembly as shown in FIG. 10.

The details of the conveyor assembly 20 will now be considered. Referring now to FIGS. 10 and 11, the drip tray 24 is shown including an oblong cavity 140 containing a drainage hole 142 at one end. Centrally located in the cavity 140 is an elongated raised body portion 144 which supports a pair of gear blocks 145 and 147 for a drive gear 146 and an idler gear 148 and around which is located a toothed drive belt 150.

The nine(9) cup holders $22_1 \ldots 22_9$ are attached to the belt 150 and travel over the track 25 which comprises an open metal grate 152 and which fits on the top portion 154 of the tray 24. The gears 146 and 148 are furthermore held apart by a pair of belt tightening rods 156 and 158 extending between the gear blocks 145 and 147. An elongated cover plate 160 fits over the ends of the gear blocks 145 and 147 to protect the gears 146 and 148 as well as the drive belt 150. Further as shown in FIG. 10, the drive gear 146 is coupled to an electrical drive motor 162 located beneath the drip tray 24 through a speed reduction device 164 and associated hardware 166.

Located on the top portion 154 of the drip tray 24 is a reed switch 165 which forms part of a magnetic reed switch sensor assembly including a permanent magnet 167 (FIG. 12A) located in the side of each cup holder $22_1 \ldots 22_9$ including a permanent for detecting the presence of a cup holder, for example cup holder $22_1$, at the cup dispensing station 66 as shown in FIG. 6. At the location of the fourth and last pick-up station $37_4$ (FIG. 1) is an infrared (IR) sensor including an IR emitter element 168 which generates an IR beam 170 which is projected across the top of the grate 152 through a cup holder, for example cup holder $22_9$ shown in FIG. 6, to a receptor element 172 located on the raised support structure 144. The purpose of this sensor is to prevent a cup holder 22, from moving around to the cup dispensing station 66 if, for some reason, it contains a cup 68 or other object which has not been removed therefrom.

In order to provide this feature, a pair of opposing IR beam passage holes 174 and 176 are located in the lower wall portion of each of the cup holders $22_1 \ldots 22_9$ as shown in FIGS. 12A and 12B. The holes 174 and 176 permit uninterrupted passage of the IR beam 170 from the emitter 168 to the receptor 172 as long as no cup 68 or other object is present in the cup holder 22; however, the IR beam 170 will be interrupted as long as the cup 68 or other object is present and the conveyor drive motor 162 will be prevented from operating.

Considering now the details of the cup holders $22_1 \ldots 22_9$ as shown in FIGS. 12A–12C, in addition to having an outwardly tapered beveled top rim 178, located is an elongated raised portion 180, on one side of the outer wall surface 181 within which is located the permanent magnet 167 as shown in FIG. 12A. On the opposite side of each cup holder $22_1 \ldots 22_9$ is located a member 184 by which the cup holder 22 is affixed to the drive belt 150 shown in FIGS. 10 and 11. Each cup holder, moreover, includes a pair of slots 186 and 188 as shown in FIG. 12C which extend through a bottom wall portion of the cup side wall 181 and the bottom wall 189 so as to receive a two fingered compressible spring member 190 mounted on the grate 152 by a bracket 192 as shown in FIG. 10.

The spring member 190 is adapted to operate in conjunction with a set of upwardly projecting barb type cup stops 194, 195, 196 and 197 as shown in FIG. 12D located on a pair of centralized cross members 198 and 200 of the bottom wall 189 and spanning an open bottom portion of the cup holders $22_1 \ldots 22_9$ at 202. The purpose of the cup stops is for positioning three different cup sizes A (12oz.), B (16oz.) and C (21oz.) shown by the dashed circular outlines 204, 205 and 206, respectively, in the cup holder.

Figure 13A:
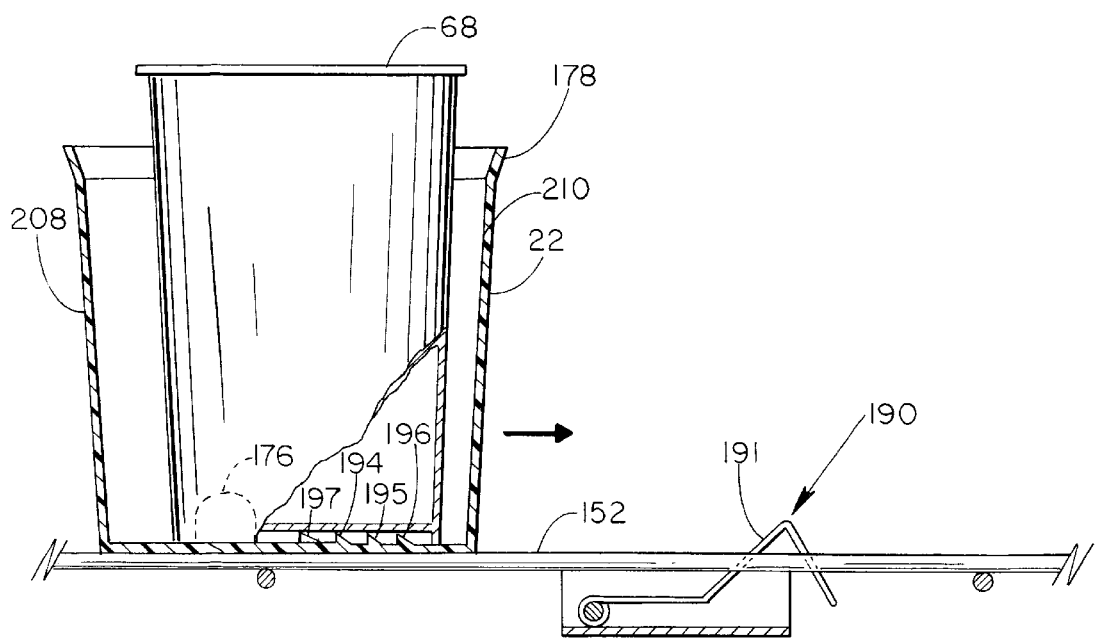
FIGS. 13A–13C are illustrative of the cup positioning operation carried out following a cup being dropped into a cup holder by the gripper/extractor mechanism shown in FIG. 6.
Figure 13B:
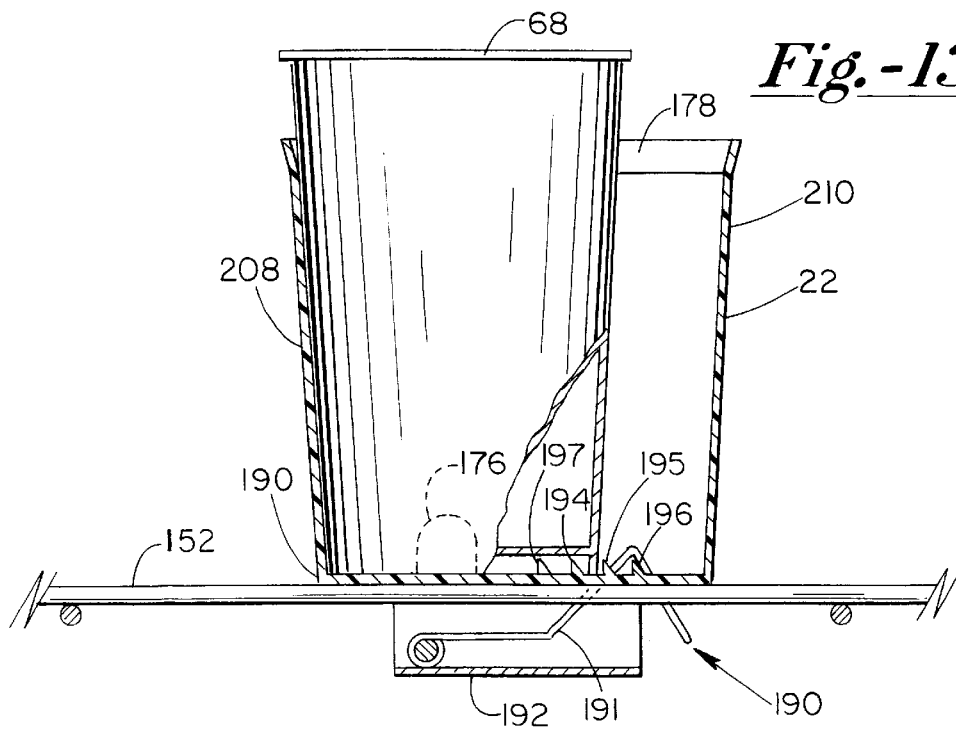
Figure 13C:
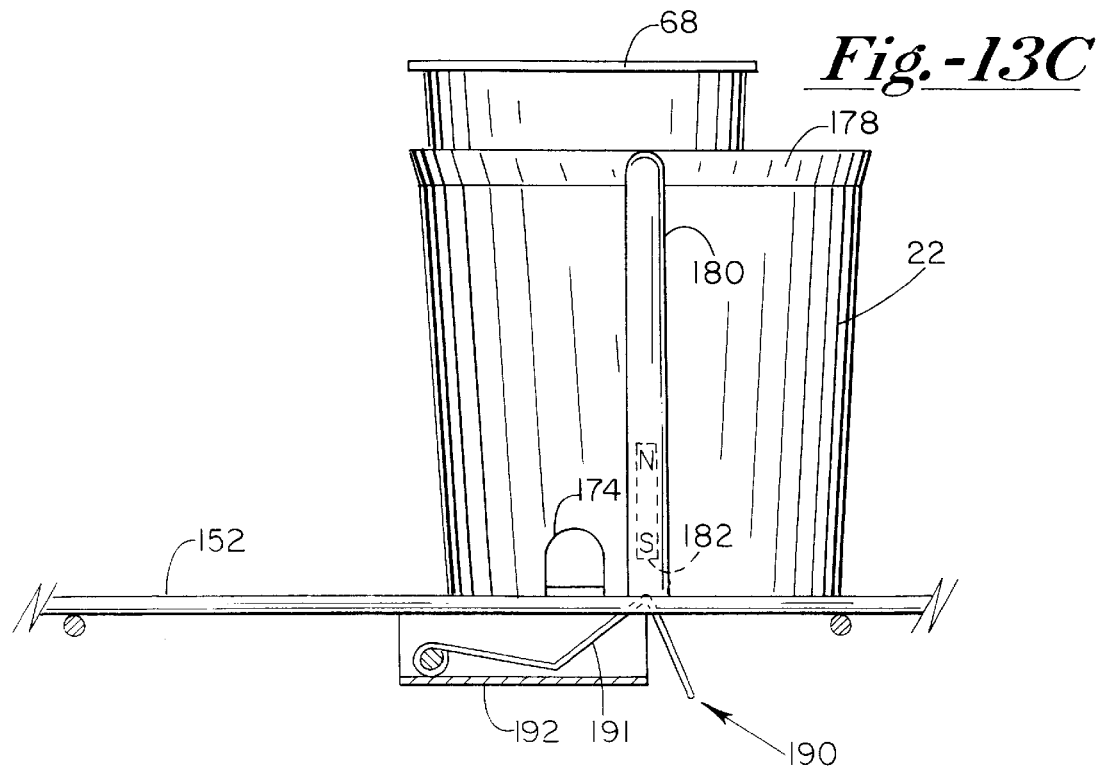

FIGS. 13A–13C are illustrative of the cup positioning operation which is carried out prior to the arrival of a cup holder $22_1 \ldots 22_9$ at the dispensing stations 29 and 31 (FIG. 6) for respectively receiving measured amounts of ice and beverage. As shown in FIG. 13A, a cup 68 of, for example, size A, has been placed in a cup holder 22 which is moving in a direction shown by the arrow. When the cup holder 22 reaches the raised arms 191 of the spring member 190 which extend through the slots 186 and 188 shown in FIG. 13B, the bottom edge of the cup 68 is contacted thereby and moved rearwardly over the cup stop members 195 and 196, where it comes to rest against the inner sidewall portion 208 of the cup holder. As the cup 68 passes over the spring member 190 as depicted in FIG. 13C, the arms 191 are forced downward by the cross member 200 (FIG. 12D). Thereafter, the spring arms 191 return to their normal upright position when the cup holder 22 clears the spring member 190.

It should be pointed out that the barb type cup stops 194, 195, 196 and 197 as shown in FIG. 12B, serve to prevent differently sized cups A, B and C from returning to their original position or toward a leading inner sidewall portion 210 of the cup holder 22. The single barbed cup stop 197 on cross member 200 serves to keep the smallest sized cup A from moving laterally to any intermediate inner sidewalls shown by reference numerals 212, 214 in FIG. 12B. This placement serves to keep any cup 68 in a proper alignment for a subsequent ice and beverage dispensing operation upon the arrival at the dispensing stations 29 and 31 shown, for example, in FIG. 11. Any cup 68 having a size greater than size C (21 oz.) does not need to be prepositioned before a dispensing operation because its size will automatically accommodate itself within the cup holder 22 for adequate targeting of ice and beverage.

Referring now to FIGS. 14 through 18, disclosed threat are the details of the cup storage and supply unit 40 referred to earlier and which is shown, for example, in FIG. 14 including five(5) cup supply tubes $42_1, 42_2 \ldots 42_5$ located on a bidirectionally rotatable turret assembly for locating a required size supply tube adjacent the extractor turret gripper assembly in the shortest possible time depending on the supply tube presently in position at the cup extraction station 66. The turret assembly consists of a central mounting plate 216 having five (5) faces $218_1 \ldots 218_5$, each including at least two keyed mounting slots 220 whose spacing is specifically coded to mate with a like number of complementary pins 224 located on respective plate members $222_1 \ldots 222_5$ affixed to the outside surface of the cup supply tubes $42_1 \ldots 42_5$ so that for a specific cup size, a cup supply tube of a designated diameter can be attached to a particular face of the mounting plate 216. When desirable, an adaptor plate 226 can be mounted on a face plate 218 to alter the size coding.

As shown in FIG. 15, cup sizes $68_a$–$68_e$ ranging from 12 Oz. to 42 Oz., are adapted to be stored in either a smaller diameter supply tube $42_a$ or a larger diameter supply tube $42_b$. The difference between the two supply tubes $42_a$, for the 12 Oz. and 16 Oz. cups $68_a$ and $68_b$ and the two supply tubes $42_a$ for 21 Oz. cups $68_c$ is a reversed orientation of the mounting plate 222. With respect to the two supply tubes $42_b$ for 32 oz. and 42 oz. cups $68_d$ and $68_e$, again it also involves a simple reversal of the mounting plate 222'. In this manner, several different combinations of tube sizes can be mounted on the turret mounting plate 16 so as to present a substantially common bottom plane 228 for the various cup sizes 68 to the gripper/extractor mechanism 38 (FIG. 6) Each of the supply tubes $42_1 \ldots 42_5$, moreover, include a plurality of bifurcated cup restraining members 230 mounted on the inside surface of the supply tubes 42 near the bottom opening thereof. The details of one cup restraining member 230 is shown in FIG. 16 and comprises a relatively short finger member 232 and a relatively long finger member 234 extending outwardly from a flat segment 236 containing a pair of mounting holes 238. The two finger members 232 and 234 are resilient and include angulated bends 240 and 242 having ridges 244 and 246 at their outer extremities.

Figure 17B:
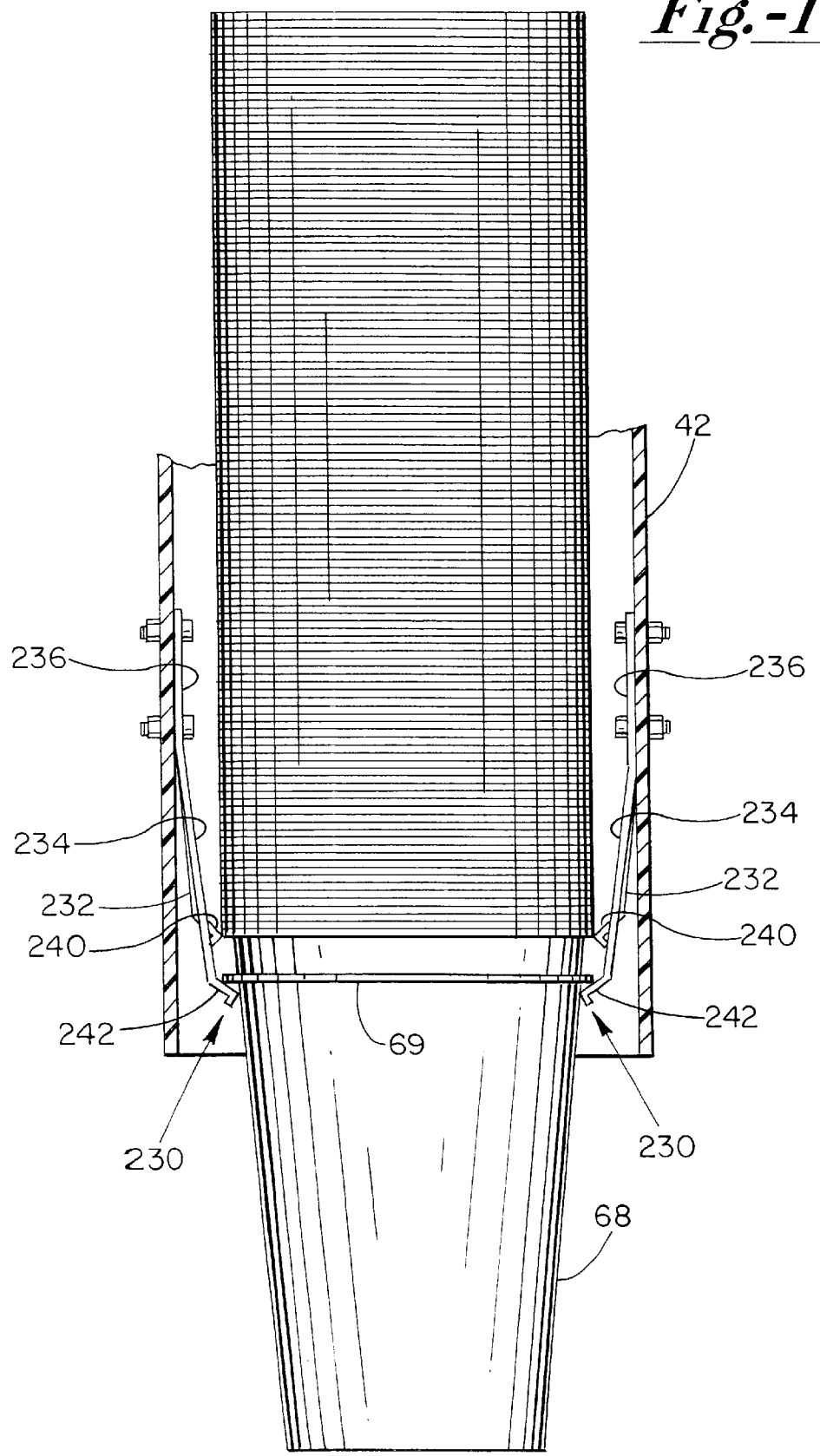

The function of the cup restrainer members 230 are illustrated in FIGS. 17A and 17B. As shown in FIG. 17A, when a relatively short stack of cups 68 is placed within a supply tube 42, the bends 240 and ridges 244 of the relatively shorter finger members 232 contact the rim 69 of the lowermost cup 68 and keeps the stack from falling through and out of the supply tube. When a cup, for example, 68' is extracted from the stack by the gripper arm assembly 38 shown, for example, in FIG. 6, its rim 69' will pull past the bend 242 and the ridges 246 of the longer finger members 234.

However, it was found that occasionally two or more cups 68 would be removed by the gripping arms 70 and 72. In this instance, the longer set of finger members 234 would catch the second cup as shown in FIG. 17B. Also, where the stack of cups 68 is relatively large as shown in FIG. 17B, often times the weight of the stack itself causes the lowermost cup 68 to position itself on the bends 242 of the longer finger members 234, with the shorter finger member 232 serving as a supplementary restraining element. Thus, both the longer and shorter finger members 232 and 234 cooperate to ensure that only one cup 68 at a time is extracted from a supply tube 42 irrespective of the size of the stack placed therein.

The turret assembly 40 shown in FIG. 14 is made bidirectionally rotatable by a drive shaft 248 passing from the mounting plate 216 through a sleeve 250 where it connects to a speed reducer 252 coupled to the shaft of a drive motor 254 which is controlled to rotate in either a clockwise (CW) or counter clockwise (CCW) direction, on demand to provide optimum speed positioning of the cup supply tubes $42_1$ ... $42_5$ as noted above.

Located above the drive motor 254 and speed reducer 252 is a rotational IR sensor assembly 256, the details of which are further shown in FIGS. 18A and 18B. The sensor assembly 256 is contained within the pair of flanged housing members 258 and 259, which are fastened together. The sensor 256 is comprised of an apertured circular disk 260 shown in FIG. 18B which is secured to a hub 261 affixed to the shaft 248.

The disk 260 includes five(5) sets of light transmissive holes or apertures $262_1$, $262_2$, ... $262_5$, with each set spanning a 50° sector of the disk 260 as shown. The outer limits of each 50° sector are defined by a pair of apertures 264 and 266 and are used for supply tube positioning and alignment at the cup extraction station 66. Within the span limit apertures 264 and 266 are one or two apertures of a set of three(3) inner apertures 268, 270 and 272 which are used to identify which of the five (5) supply tubes $42_1$ ... $42_5$ is presently located at the cup extraction station 66. The first inner aperture 268 can be found 15° away from a left outer aperture 264, while a second inner aperture 270 can be found located 10° away from aperture 268. The third inner aperture 272 can be found 10° away from the second inner aperture 270 or 15° away from the right outer aperture 266.

The apertured disk 260 operates in conjunction with five(5) IR emitter/receptor sensors 274, 276, 278, 280 and 282 mounted on a circuit board 284 as shown in FIG. 18A, for sensing the five apertures 264, 266, 268, 270 and 274. In operation, the disk 260 rotates in a horizontal plane where the peripheral edge thereof rotates in a groove 286 (FIG. 18A) separating the respective emitter portion and receptor portion of each of the IR sensors 274 ... 282. The particular location of the apertures 264 ... 272 as sensed by the sensors 274 ... 282 is used to determine the current position of the turret assembly and to center a particular supply tube $42_1$ ... $42_5$ adjacent the gripper arms 70 and 72 as shown in FIG. 6 at the extraction station 66.

Figure 21A:
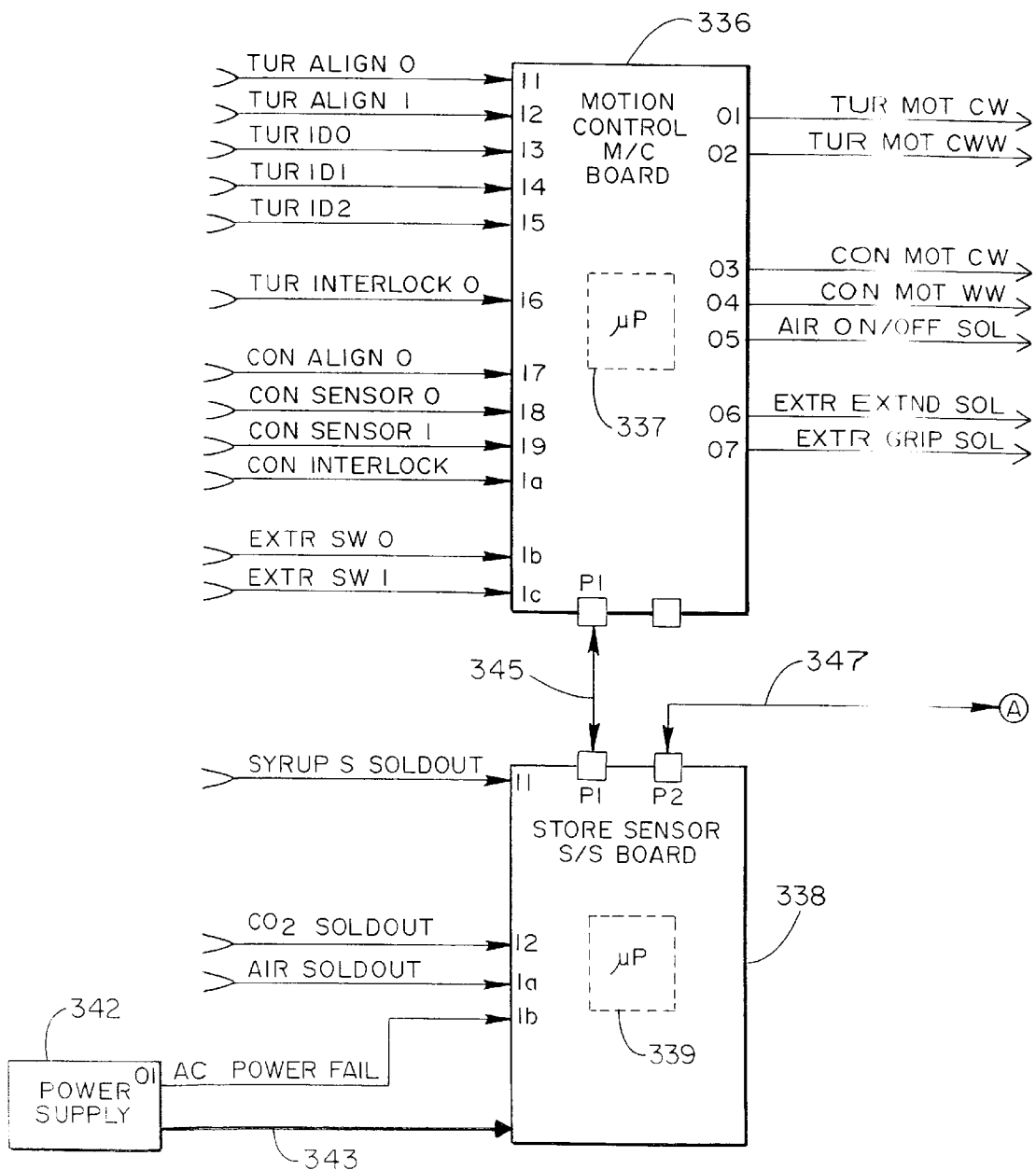
FIGS. 21A and 21B are a block diagram of the electrical control system of the subject invention.
Figure 21B:
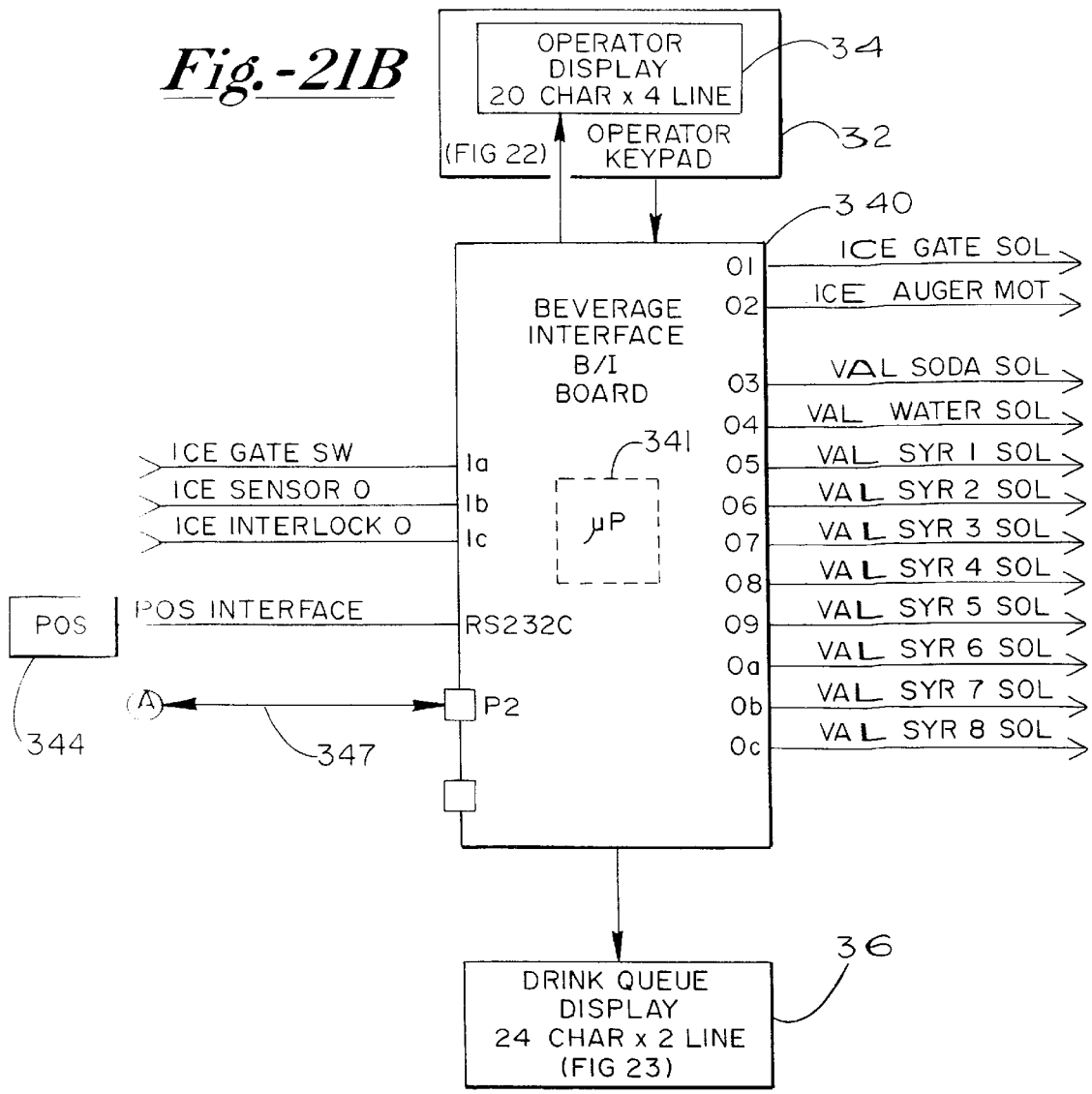

The particular pattern of transmission and non-transmission of the IR beams through the three intermediate apertures 268, 270 and 272, is used to detect which of the five(5) supply tubes is present. There are five unique combinations of apertures, 268, 270 and 272, that correspond to the five(5) supply tubes. The signal outputs from the five(5) IR sensors 274 ... 282 shown in FIG. 18B, are coupled via a cable 288, to a system controller, the architecture of which is shown in FIG. 21 and will be described hereinafter.

Before discussing the electrical control scheme employed in the subject invention, reference will first be made to the pneumatic control system, shown in FIG. 19 which also forms part of the subject invention. As shown, in addition to the gripper and extractor mechanism 38 (FIG. 8) including a pneumatically actuated lifter assembly 78 and a pneumatically actuated gripper assembly 80, there is also included is an ice gate actuator assembly 290 which is further shown in FIGS. 20A and 20B including a pneumatic cylinder 292 and a piston rod 294 connected to a piston, not shown, located within the cylinder 292. The piston within the cylinder 292 is activated pneumatically by air being supplied to either of two air supply lines 296 or 298. A piston sensor assembly 300 which may be, for example, a magnetic reed switch assembly is shown mounted on the rear portion of the cylinder 292 and is capable of detecting the position of the piston and accordingly the extension and the retraction of the piston rod 294.

Figure 20A:
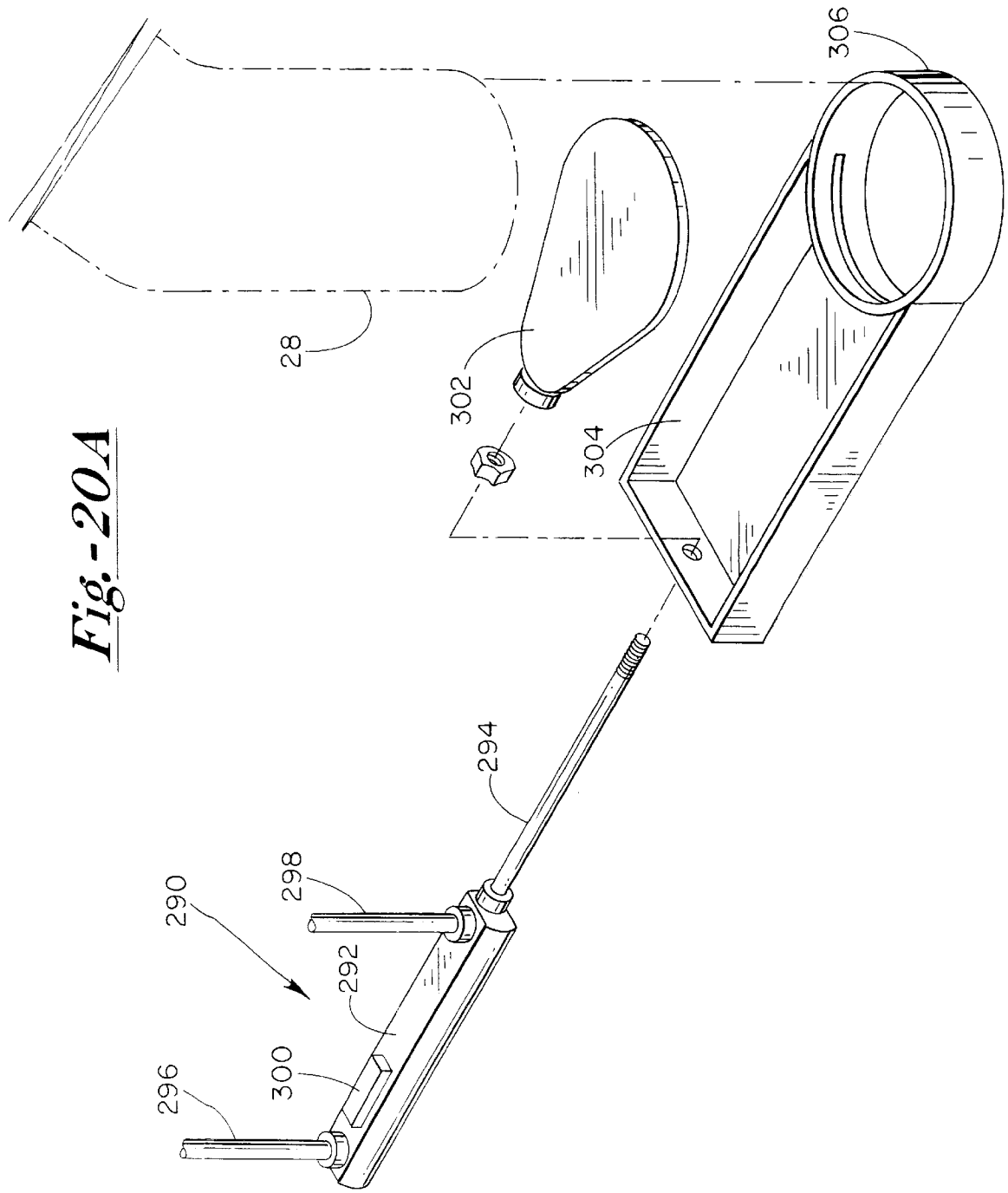

As shown in FIG. 20A, the piston rod 294 is connected at its outer end to a flat paddle type door member 302 which slides within a frame 304. The frame has a circular outer end section 306 which is fitted to the ice chute 28 so that the ice door 302 can slide alternately back and forth to block and unblock ice flow through the chute 28. The door 302 is cycled to open and close in response to actuation of the piston assembly 290, with the amount of time the door is open determining the amount of ice which is delivered into a cup 68 at the ice dispensing station 29 prior to a beverage dispensing operation 31.

Figure 19:
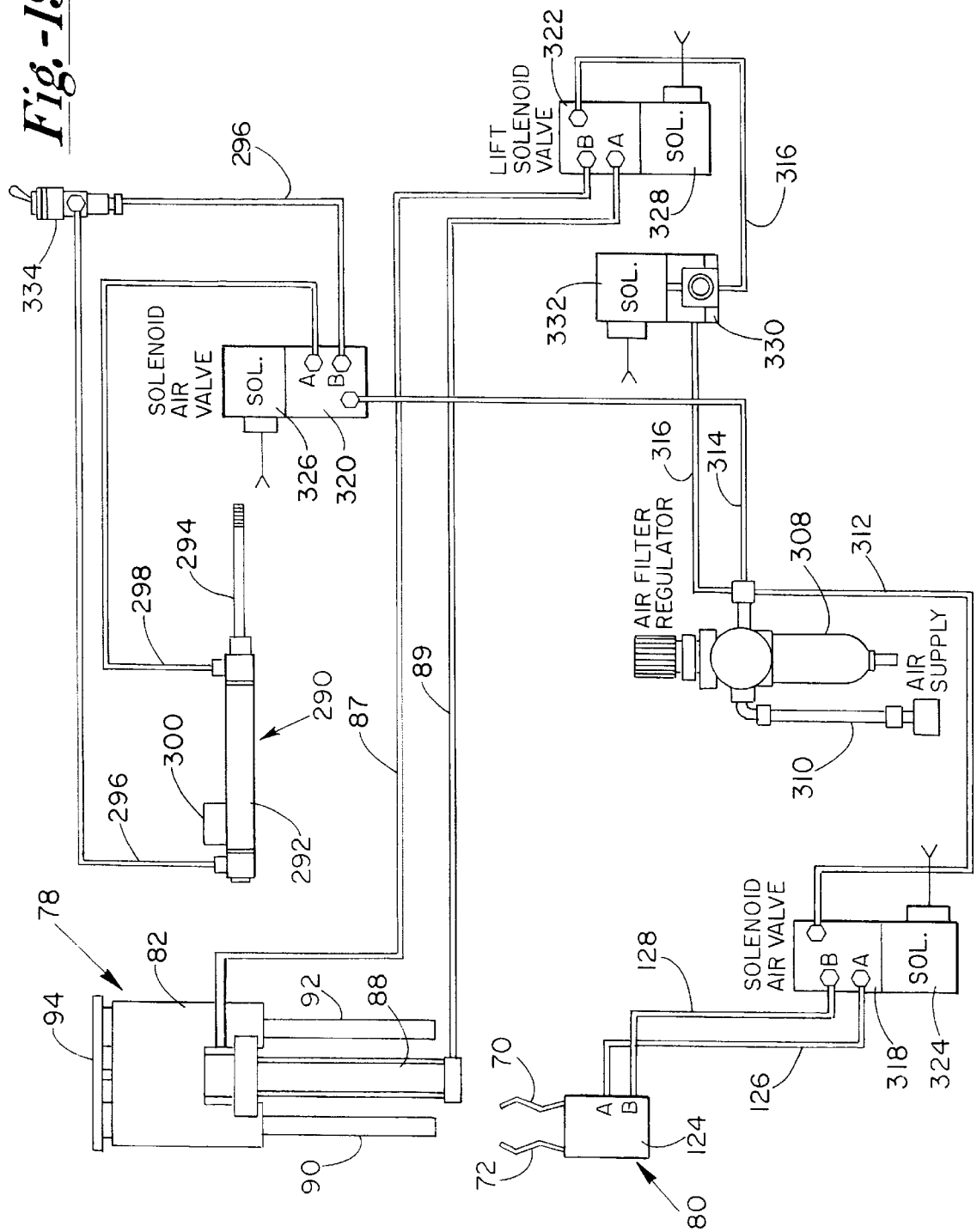
FIG. 19 is a mechanical schematic diagram illustrative of the pneumatic actuating system utilized by the subject invention.

Accordingly, and as shown in FIG. 19, compressed air from a source, not shown, is fed to an air filter/regulator 308 by an input air supply line 310. Three air supply output lines 312, 314 and 316 are coupled from the air regulator 308 to respective solenoid operated control valves 318, 320 and 322, which respectively operate the gripper arm piston assembly 80, the ice gate assembly 290 and the gripper arm lift assembly 78. Each of the control valves 318, 320 and 322 are operated by respective electrical solenoids 324, 326 and 328 by the electrical control circuitry shown in FIG. 23. A fourth solenoid controlled valve 330 and solenoid 332 therefor, is located in the air supply line 316 feeding the lift solenoid valve 522 for presenting the lift assembly 78 from being actuated when the dispensing system is, for example, inactive.

A manually operated air interrupter switch 334 is also located in the ice gate air supply line 296 for disabling the ice gate assembly 290 when necessary to permit safe servicing of the assembly.

With respect to the electrical control of the subject system, an electrical block diagram of the control system architecture is shown in FIG. 21. The electrical control system essentially consists of three printed circuit boards 336, 338 and 340 comprising a motion control (M/C) board, a store sensor (S/S) board, and a beverage interface (B/I) board, with each circuit board including one or more programmable controllers such as digital signal microprocessors 337, 339 and 341 which are located in the lower portion 14 of the cabinet 10 (FIG. 1) beneath the conveyor assembly 20. Additionally, the electrical control system includes, as shown in FIG. 21, a point of sale (POS) unit 344, which may be, for example, a remote cash register, an operated actuated touch type keypad 32, and a pair of display units 32 and 36.

The store sensor (S/S) board 338 basically has for its purpose controlling AC power being fed to the motion control (M/C) board 336 and the beverage interface (B/I) board 340. As shown, a power supply 342 is connected to the store sensor (S/S) board 338 by a power bus 343. The S/S board 338 also includes four inputs to terminals I1, I2, $I_a$ and $I_b$, the last of which is indicative of an AC power failure. The other three inputs comprise signals (Soldout) indicative of a lack of beverage syrup, to no C02 for providing carbonated water and no air for the pneumatics system shown in FIG. 19. Any one of the four inputs can cause the microprocessor 339 to signal a circuit interruption of AC power on the power leads 345 and 347 connected between terminals P1 and terminals P2 of the motion control (M/C) board 336 and the beverage interface (B/I) board 340.

The motion control (M/C) board 336 is shown receiving five IR sensor inputs at terminals I1, I2 . . . I5 which correspond to the signals generated by the five I/R sensors 274 . . . 282 in the sensor assembly 256 (FIG. 18B) and which indicate turret position and the supply tube identification. A turret interlock input is also provided at I6. These inputs are processed by the microprocessor 337 to provide either a clockwise or counter clockwise motor control signal at the outputs O1 and O2 for the turret drive motor 254 shown in FIG. 14.

The second set of inputs to M/C board 336 comprises four inputs to terminals I7, I8, I9 and Ia indicating the state of the cup holder reed switch 165 at the extractor station 66 and the IR beam 170 across the conveyor track at the fourth dispensing station 374 for controlling the conveyor drive motor 162 and which is provided by control signals at outputs O3 and O4. Also an output O5 is provided for controlling the on/off air solenoid 332 in the gas supply line 316 associated with the lift solenoid valve 22 in FIG. 19. Two control signal outputs O6 and O7 are additionally used for activating solenoids 328 and 324, respectively, for the lift assembly 78 and the cup gripping assembly 80 shown in FIG. 19.

With respect to the beverage interface (B/I) board 340, it includes inputs from the operator keypad 32 or the point of sale (POS) unit 344 along with three inputs at 1a, 1b and 1c concerning the condition of the ice gate 302. These inputs are used by the microprocessor 341 to control the ice gate solenoid 326 shown in FIG. 19, the ice auger motor 60 shown in FIG. 4, and a set of ten(10) solenoids, not shown, coupled to the outputs O3, O4, . . . Ob, Oc which control the amount of soda water, the amount of still water, and the amount of eight different selections of beverage syrup used by a set of dispensing valves, not shown, located in the section 12 of the cabinet 10 behind the panels 32 and 36 in the vicinity of the ice chute 28 and model assembly 30.

Figure 2:
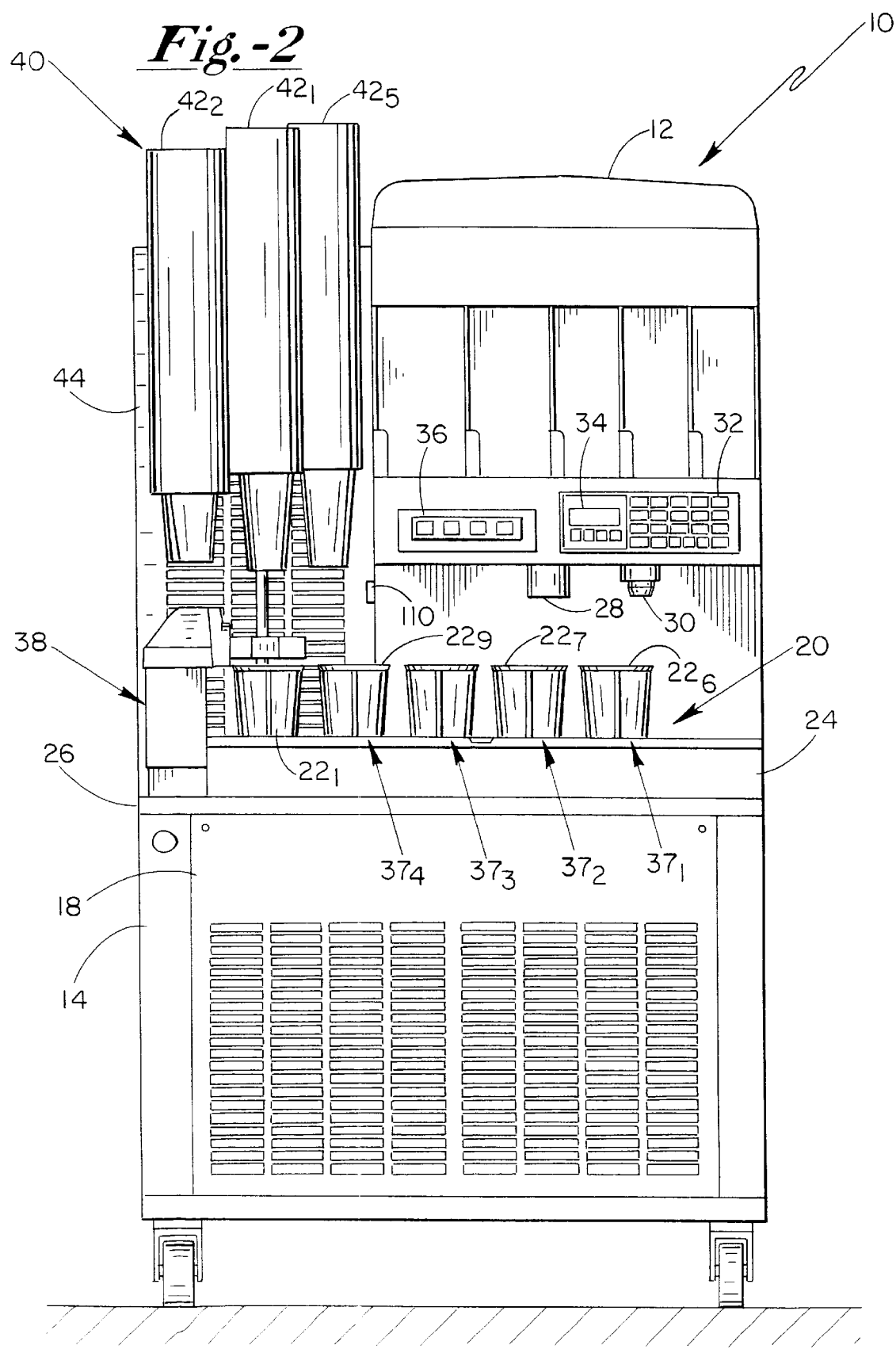
FIG. 2 is a front elevational view of an embodiment of the invention shown in FIG. 1.
Figure 3:
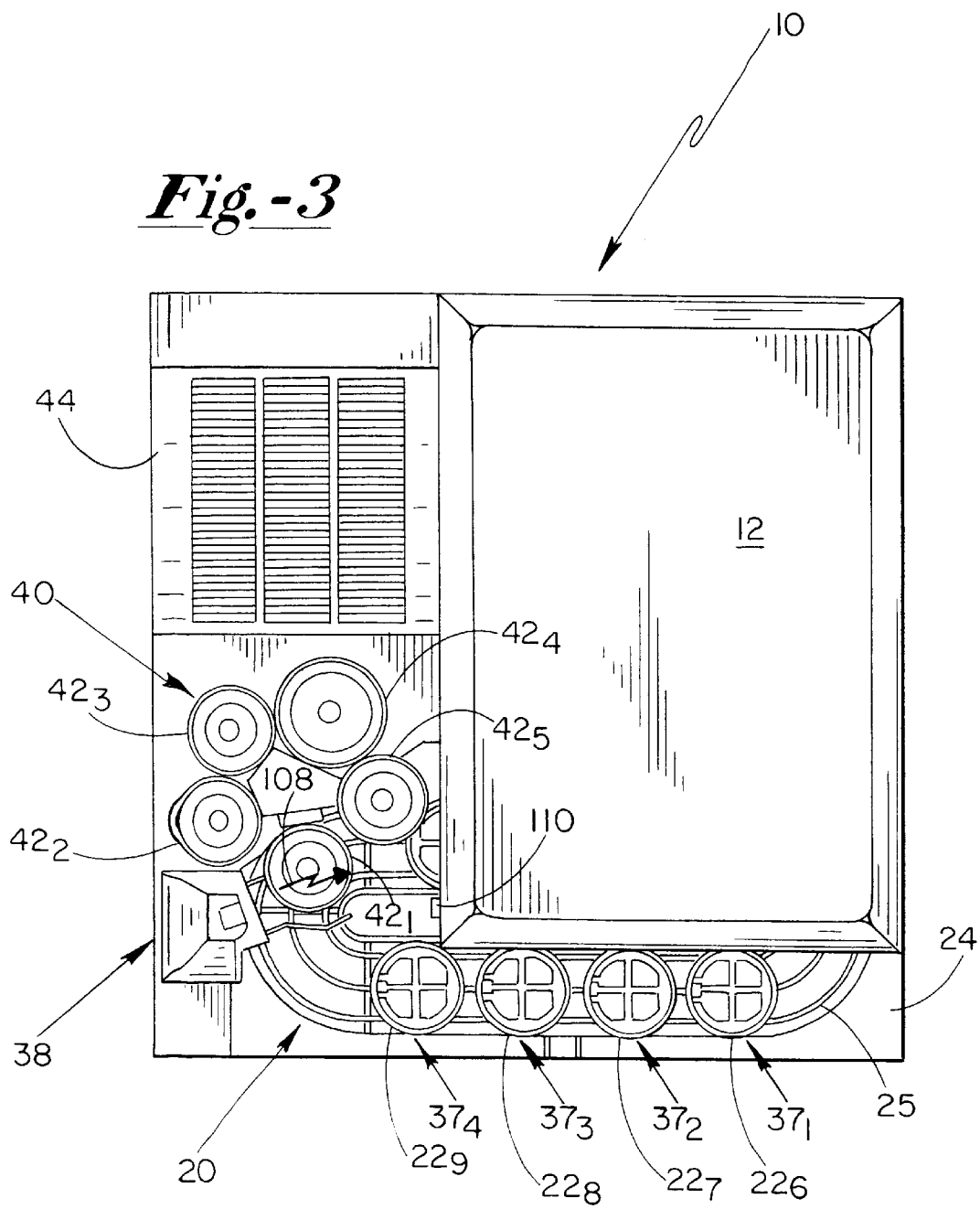
FIG. 3 is a top elevational view of the embodiment of the invention shown in FIG. 1.

The keypad 32 is located on the front of the cabinet 10 and is shown in greater detail in FIG. 2. The keypad 22 includes a set of selection keys $346_1$ . . . $346_{15}$ which permit an operator to program and/or select five(5) different drink sizes, eight(8) different beverage flavors, and water only, or soda only. Also included are a row of keys $346_{16}$ . . . $346_{21}$ at the bottom which permit selection of manual/automatic operation, alarm silencing, selection change, no ice, extra ice, and system control function entry.

A 20 character×4 line operator display 34 is included in the upper left portion of the panel 32. Below the display 34 is a set of four touch actuated keys $348_1$ . . . $348_4$ for moving the material displayed in four orthogonal directions, i.e. up, down, left and right, with the displayed information being generated by the beverage interface board 340 shown in FIG. 21. The beverage interface board 340 is also shown controlling a 24 character×2 line drink display 36, which is shown in FIG. 23 also located on the front of the cabinet 10 and includes four separate relatively small display windows $350_1$, $350_2$, $350_3$ and 3504 and which operate to scroll the description of the beverage being sequentially conveyed in cup holders $22_1$ . . . $22_9$ to the four pick-off stations $37_1$, $37_2$ $37_3$ and $37_4$ on the front of the conveyor 20 as shown, for example, in FIG. 1.

Figure 24B:
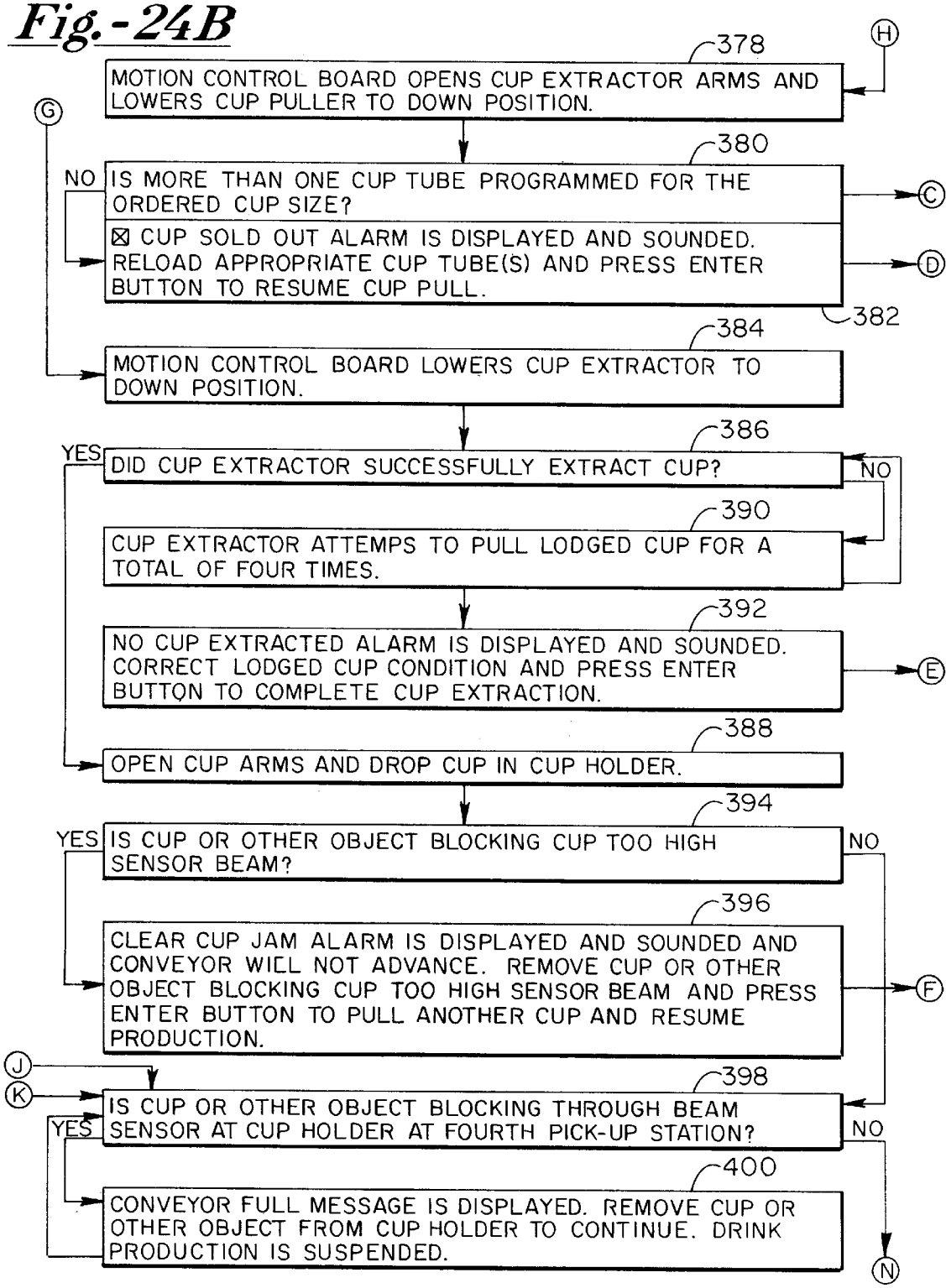
Figure 24C:
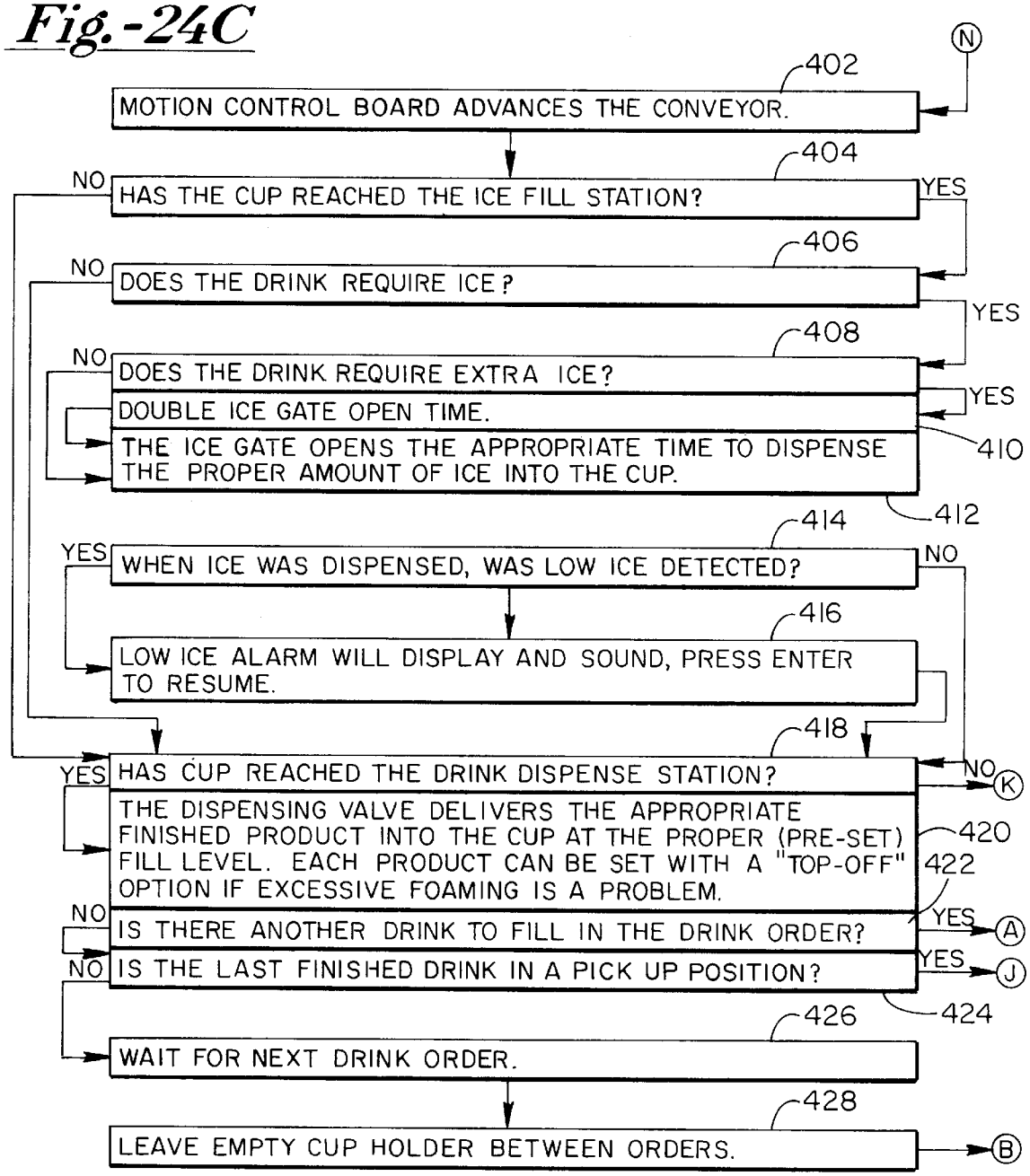

The overall operation of the system implementing the subject invention is shown in the flow chart illustrated in FIGS. 24A–24C. Considering now system operation, as shown in FIG. 24A, operation begins with step 352 wherein a drink is ordered at the point of sale (POS) unit 344 shown in FIG. 21, or by way of the touch panel 32 shown in FIG. 23. Next, as shown by step 354, the beverage interface (B/I) board 340 shown in FIG. 21, receives the drink order and thereafter manages the drink preparation through to completion by its microprocessor 341. This is accompanied by step 356 where the motion control (M/C) board 336 receives an order to extract a cup 68 from one of the cup supply turret tubes $42_1$ . . . $42_5$ shown, for example, in FIG. 1, under control of the microprocessor 337.

This is followed by determination as to whether or not a cup 68 or other object is blocking the IR sensor beam 108 shown in FIG. 1 across the cup drop path. This comprises step 358. If the determination is positive, order production is suspended and a clear cup jam alarm is displayed and sounded, indicated by step 360. Removal of the obstructing object and a subsequent pressing of the enter button $346_{21}$ on the touch control panel 32 is required to resume operation. If the cup drop path is clear, the motion control (M/C) board 336 indexes the cup supply turret assembly 40 to place the appropriate cup supply tube $42_1$ . . . $42_5$ at the dispensing station 66 as shown by step 362.

Next, a determination is made at step 364 as to whether or not the product, i.e. beverage ordered, requires a preflush of the dispensing valve nozzle assembly 30 because of the previous type of drink that was dispensed. If the determination is in the affirmative, the motion control (M/C) board 336 advances the conveyor assembly 20 clockwise by one cup holder position to leave an empty cup holder 22 for a flushing of the valve nozzle assembly 30. This is indicated by step 366. If a negative determination is made in step 364, the motion control (M/C) board 366 then raises the cup gripper/extraction mechanism 38 as shown in FIG. 7B to the UP position. This is indicated by step 368.

This is followed by a determination as to the position of the lift proximity switch 132 shown by step 370. If the gripper/extraction mechanism 38 has not reached the UP position, then a clear cup jam alarm is displayed and sounded. Also, the conveyor 20 and the turret assembly 40 is disabled as shown by step 362. This requires removal of the cup or other object blocking the lift mechanism 38 and again requires the pressing of the enter button $346_{21}$ to thereafter extract a cup and resume operation.

If the reed switch assembly 132 reads an UP position, then a step 374 is carried out to close the gripper arms 70 and 72 via the motion control (M/C) board 336.

This is followed by a determination as to whether or not a cup 68 is present in the cup supply tube 42$_1$ ... 42$_5$ which is currently present at the extraction station 66. This is evidenced by step 376 and is carried out by the magnetic reed switch assembly 136 shown in FIGS. 9A and 9B. If there is no cup 68 in the cup supply tube 42 present at the extraction station 66, the motion control (M/C) board 336 opens the gripper arms 70 and 72 and lowers the mechanism 38 to the DOWN position, as shown by step 378 in FIG. 24B.

Next, a determination is made as to whether more than one cup supply tube 42 provides the size of cup needed, such as when one cup size is used more than others. This is shown by the query step 380. If the determination is affirmative, then the program sequence loops back to step 362 and then continues onward. If the determination is in the negative, then an empty supply tube (sold out) alarm is displayed and sounded as shown by step 382.

A reloading of the appropriate cup supply tube is required which is then followed by pressing of the enter button 346$_{21}$ once again to resume a cup extraction from a filled supply tube 42 by looping back to step 368 (FIG. 24A).

If there is a cup present in the appropriate cup supply tube 42 per step 366, then the motion control (M/C) board 336 lowers the extractor/gripper assembly 38, to the DOWN position, as shown by step 384 to extract the cup. Next, a query step 386 is entered for determining whether the gripper/extractor assembly 38 has successfully extracted a cup 68 by only a partial closure of the gripper arms 70 and 72 and which would be indicated by non-actuation of the magnetic reed switch 138 in proximity sensor 136. If the determination is positive, then the gripper arms 70 and 72 are opened and the extracted cup 68 is dropped into a cup holder 22 at the extraction station 66, as shown by step 388.

If the determination in step 386 is negative, then the gripper arms 70 and 72 are commanded to attempt to extract a cup 68 in four(4) successive arm closing attempts, as shown by step 390. After each attempt, the program loops back to step 386. If after four(4) unsuccessful attempts to grasp a cup 68, then an alarm is displayed and sounded per step 392. Correction of a lodged cup condition is required followed by a pressing of the enter button 34621 in order to complete a cup extraction. This is followed by a repeat of steps 368–388.

In the operation of grasping and dropping a cup 68 into a cup holder 22 as shown by step 388, if a cup or other object interrupts the IR sensor beam 108 across the cup drop path as shown by query step 394, step 392 indicates that a cup jam alarm is displayed and sounded and further conveyor movement is stopped. Removal of the cup or other object blocking the sensor beam 108 is required per step 396 followed by a pressing of the button 346$_{21}$, whereupon another extraction step 368 is made.

Following the dropping of an empty cup 68 into a cup holder 22 at the extraction station 66, determination is made per step 398 as to whether a cup or other object is interrupting the infrared beam 170 (FIG. 10) passing through the cup holder 22 located at the fourth and last pick-up station 37$_4$ shown in FIG. 1. If the IR beam 170 is interrupted, a conveyor full message is displayed, as shown by step 400. Further drink production is interrupted until the cup or other object is removed from the cup holder 22 at pick-up station 374 before continuing.

If the cup holder 22 is empty at the last pick-up station 37$_4$, the motion control (M/C) board 36 then directs the conveyor drive motor 162 to advance the empty cup holder 22 at station 374 to the extraction station 66 as shown in step 402 in FIG. 24C.

This now leads to the ice and beverage dispensing steps required in preparing a drink order. Accordingly, as shown by query step 404, a determination is made as to whether or not a cup holder 22 with a cup 68 therein has reached the ice dispensing station 29, shown, for example, in FIG. 6. This is followed by steps 406–416.

If the cup holder 22 has not reached the ice delivery station 29, a query is made at step 418 as to whether or not the cup holder 22 has reached the drink dispensing station 31. In the event that the drink requires ice, per step 406, an inquiry is made as to whether the drink requires extra ice as shown in step 408. If the answer is in the affirmative, step 410 is entered, at which time the ice gate open time is doubled per step 410. Otherwise, the ice gate remains open for the appropriate time to dispense the proper amount of ice into the cup as shown by step 412.

With the dispensing of ice completed, query step 414 is made to determine whether the ice dispensed was insufficient. If so, step 416 indicates that a low ice alarm will be displayed and an alarm sounded. Again, this requires actuating the enter key 346$_{21}$ to resume operation. If the proper amount of ice has been dispensed per step 414, step 418 is initiated.

If the cup holder 22 has reached the drink dispensing station 31, a dispensing valve delivers the appropriate amount of ordered beverage into a cup 68 at the proper preset fill level, as shown by step 420. Furthermore, a "top-off" option is available if excess foaming is a problem.

Referring now back to step 418, if the cup holder 22 has not reached the drink dispensing station 31, the system operation reverts back to step 398 shown in FIG. 24B. Step 422 indicates that a determination is made as to whether or not another drink needs to be filled in the drink order, which if there is, the system operation loops back to step 368 in FIG. 24A and the operation repeats itself. If it consists in the last drink in an order, step 424 determines whether the cup holder 24 for the last finished drink is at the last pick-up station 37$_4$. If the answer is affirmative, then the operation loops back to step 398 shown in FIG. 24B.

If the determination is in the negative, step 426 indicates that the system is ready for the next drink order, which upon receipt, causes the conveyor 20 to leave an empty cup holder 22 between the last-filled order and the next order to be filled, as shown by step 428, whereupon system operation loops back to step 354 shown in FIG. 24A, where the beverage interface (B/I) board 340 receives the next drink order to be filled.

Thus what has been shown and described is an automated beverage dispensing system whereby orders of different flavors and sizes can be ordered by an operator from a remote point of sale unit or from a front control panel, whereupon they are automatically filled and delivered to a plurality of manual pick-up stations on the front of a conveyor.

Having thus shown and described what is at present considered to be the preferred embodiment of the invention, it should be noted that the same has been made by way of illustration and not limitation.

What is claimed is:

1. A cup conveyor for an automated beverage dispensing system, comprising:
    a motor driven carousel type of cup conveyor including a plurality of open cup holders which travel over a grate and spillage tray for transporting beverage cups past a beverage dispensing station to a pick-up station, and wherein each of the cup holders includes an open portion in the bottom thereof and the grate includes an upwardly projecting resilient bias member extending through said open portion for moving a cup dropped into a cup holder against an inner wall surface of the cup holder for optimally receiving a beverage during a beverage dispensing operation.

2. A system according to claim 1 wherein said bias member comprises an angulated spring type element mounted on the grate and being deformable by movement of a cup holder thereover toward the dispensing station.

3. A system according to claim 2 wherein said spring type element includes a pair of upwardly projecting arms for contacting a bottom rim portion of the cup inside the cup holder.

4. A system according to claim 1 and wherein each of the cup holders includes a set of upwardly projecting cup stops in a bottom portion thereof for keeping a cup in place once moved against the inner wall surface of the cup holder.

5. A system according to claim 4 wherein the bottom of said cup holders includes a pair of centralized cross members spanning said open portion and wherein the set of cup stops are located on said cross members.

6. A system according to claim 5 wherein the set of cup stops include a plurality of cup stops on one of said pair of cross members and at least one cup stop on the other of said pair of cross members.

7. A system according to claim 5 wherein said cup stops comprises barb type elements.

8. A system according to claim 1 wherein the cup conveyor includes a sensor assembly for detecting the arrival of an empty cup holder at a cup extraction station.

9. A system according to claim 8 wherein said sensor assembly comprises a magnetic sensor assembly including a magnet element mounted on a body portion of each said cup holders and a magnetic detector element located in a fixed position on a side portion of the conveyor.

10. A system according to claim 1 wherein the beverage dispensing system includes plurality of pick-up stations and wherein the cup conveyor includes a sensor assembly located at a last pick-up station of said pick-up stations for detecting a cup holder containing a cup so as to inhibit further movement of the conveyor until the cup is removed from the cup holder.

11. A system according to claim 10 wherein said sensor assembly for detecting a cup holder containing a cup comprises a light energy sensor assembly generating a beam of light passing across the conveyor so as to intersect a cup holder, and wherein the cup holders include apertures for the passage of the beam therethrough.

12. A system according to claim 11 wherein said sensor assembly includes an infrared emitter element and a receptor element located on opposite sides of a section of said cup conveyor.

13. A cup storage and dispensing assembly for an automated beverage dispensing system, comprising:

a rotatable turret having a plurality of cup supply tubes of a predetermined size mounted thereon for providing a mix of different sized cups at a cup extration station, a drive motor for rotating the turret, and control means for controlling the drive motor so as to rotate the turret in either a clockwise or counter clockwise direction for minimizing the time for a cup supply tube containing a desired sized cup to be positioned at the cup extraction station, the improvement comprising: the rotatable turret including a central mounting plate including an arrangement of supply tube size attachment elements having a specific pattern for each size of supply tube to be mounted thereon and wherein each size of supply tube includes complementary attachment elements for attachment to said control mounting plate at a predefined location around the mounting plate.

14. A system according to claim 13 wherein the turret includes a sensor assembly for detecting which of said cup supply tubes is presently in position at the cup extracting station.

15. A system according to claim 14 wherein the sensor for detecting supply tube position comprises a light energy sensor assembly including a rotatable disk attached to a shaft connected to the drive motor, said disk having a respective set of apertures being spaced apart so as to define a code for each of said plurality of supply tubes, and a set of light emitter and receptor elements located on either side of said disk for detecting a coded pattern of light transmission and non-transmission indicative of both size and position of the supply tubes positioned opposite the gripper arms.

16. A system according to claim 15 wherein the coded apertures are located at the periphery of the disk.

17. A system according to claim 16 wherein said light emitter and receptor elements comprise infrared elements.

18. A system according to claim 13 wherein said attachment elements include complementary sets of pins and slots.

19. In a cup storage and dispensing assembly for an automated beverage dispensing system, comprising, a rotatable turret having a plurality of cup supply tubes of a predetermined size mounted thereon for providing a mix of different sized cups at a cup extraction station, a drive motor for rotating the turret, and control means for controlling the drive motor so as to rotate the turret in either a clockwise or counter clockwise direction for minimizing the time for a cup supply tube containing a desired sized cup to be positioned at the cup extraction station, the improvement comprising: said cup supply tube including at least one bifurcated cup restraining member located in a bottom portion of the respective supply tube, said restraining member comprising a resilient member having a relatively short finger element and an adjacent relatively long finger element, both of said finger elements angulating inwardly and including an inwardly bent end portion for stopping a cup by contacting a rim portion thereof, and wherein cup stopping at one of the end portions is dependent on the weight of overlying cups in a stack of cups located in the supply tube.

20. A system according to claim 19 wherein at least one cup restraining member comprises a plurality of cup restraining members located around the bottom portion of the tube.

21. A method of dispensing beverages from an automated beverage dispensing system, comprising the steps of:

moving a plurality of cup holders containing beverage cups on a conveyor;

filling a drink order inputted to the system, and leaving a cup holder vacant between drink orders for serving as a marker delineating the last-filled cup of one order and the first-filled cup of a following order.

* * * * *

UNITED STATES PATENT AND TRADEMARK OFFICE
CERTIFICATE OF CORRECTION

PATENT NO.: 6,102,246

DATED: August 15, 2000

INVENTORS: Douglas P. GOULET et al.

It is certified that errors appear in the above-identified patent and that said Letters Patent is hereby corrected as shown below:

CLAIM 5, Col. 15, L. 23, "are located" should read --is located--.

CLAIM 6, Col. 15, L. 25, "include" should read --includes--.

CLAIM 7, Col. 15, L. 29, "comprises" should read --comprise--.

CLAIM 13, Col. 15, L. 59, "extration" should read --extraction--.

Signed and Sealed this

Seventeenth Day of April, 2001

*Attest:*

NICHOLAS P. GODICI

*Attesting Officer*  *Acting Director of the United States Patent and Trademark Office*